(12) United States Patent
Kennedy et al.

(10) Patent No.: US 6,932,997 B2
(45) Date of Patent: Aug. 23, 2005

(54) METHOD FOR FORMING MULTIPLE ROWS OF MEAT PATTIES

(75) Inventors: Thomas J. Kennedy, Wheaton, IL (US); Darren S. Lange, Wheaton, IL (US); Richard C. Fausey, Elburn, IL (US)

(73) Assignee: OSI International, Inc., Aurora, IL (US)

( * ) Notice: Subject to any disclaimer, the term of this patent is extended or adjusted under 35 U.S.C. 154(b) by 59 days.

(21) Appl. No.: 10/454,068

(22) Filed: Jun. 3, 2003

(65) Prior Publication Data

US 2003/0211191 A1 Nov. 13, 2003

Related U.S. Application Data

(62) Division of application No. 09/881,483, filed on Jun. 14, 2001, now Pat. No. 6,592,359.

(51) Int. Cl.[7] .............................. A22C 7/00; B29C 45/34
(52) U.S. Cl. ........................................ 426/513; 426/516
(58) Field of Search ................................. 426/512, 513, 426/516; 425/572, 575, 812

(56) References Cited

U.S. PATENT DOCUMENTS

| 2,852,809 A | 9/1958 | Miles |
|---|---|---|
| 2,942,987 A | 6/1960 | Beerend |
| 3,191,232 A | 6/1965 | Haller |
| 3,241,178 A | 3/1966 | Bridge, Jr. |
| 3,416,187 A | 12/1968 | Chartier |
| 3,654,665 A | 4/1972 | Holly |
| 3,731,345 A | 5/1973 | Brackman |
| 3,747,160 A | 7/1973 | Holly |
| 3,750,232 A | 8/1973 | Holly |
| 3,765,056 A | 10/1973 | Holly |
| 3,851,355 A | 12/1974 | Hughes |

(Continued)

FOREIGN PATENT DOCUMENTS

| DE | 196 27 661 A1 | 1/1967 |
|---|---|---|
| DE | 69105352 T2 | 4/1991 |
| EP | 036687 | 7/1989 |
| EP | 0459166 B1 | 11/1994 |
| GB | 2 212 096 A | 7/1989 |
| NL | WO 95/02332 | 1/1995 |
| NL | 0 818 148 A1 | 1/1998 |
| WO | WO 99/62344 | 12/1999 |
| WO | WO 01/41575 | 6/2001 |
| WO | WO 02/068172 | 9/2002 |

Primary Examiner—George C. Yeung
(74) Attorney, Agent, or Firm—Bell Boyd & Lloyd LLC

(57) ABSTRACT

The present invention provides a method for forming multiple rows of meat patties. An existing single row forming machine is modified by moving the fill slot relative to the existing stroke length so that the fill slot comes in contact or fluidly communicates with at least one newly added row of cavities. This is most easily achieved by modifying the existing fill plate and by adding cavities to the existing mold plate, so that the combination of modified plates operates with the existing stroke length (which is difficult to change), to produce multiple rows of consistent meat patties.

31 Claims, 15 Drawing Sheets

U.S. PATENT DOCUMENTS

| | | |
|---|---|---|
| 3,869,757 A | 3/1975 | Holly |
| 3,887,964 A | 6/1975 | Richards |
| 3,909,880 A | 10/1975 | Holly |
| 3,940,217 A | 2/1976 | McCarthy |
| 4,054,967 A | 10/1977 | Sandberg |
| 4,097,961 A | 7/1978 | Richards |
| 4,118,831 A | 10/1978 | Holly et al. |
| 4,153,974 A | 5/1979 | Holly et al. |
| RE30,096 E | 9/1979 | Richards |
| 4,182,003 A | 1/1980 | Lamartino et al. |
| 4,187,581 A | 2/1980 | Wagner |
| 4,272,864 A | 6/1981 | Holly |
| 4,338,702 A | 7/1982 | Holly |
| 4,356,595 A | 11/1982 | Sandberg et al. |
| 4,372,008 A | 2/1983 | Sandberg |
| 4,418,446 A | 12/1983 | Sandberg et al. |
| 4,535,505 A | 8/1985 | Holly et al. |
| 4,597,135 A | 7/1986 | Holly |
| 4,697,308 A | 10/1987 | Sandberg |
| 4,768,941 A | 9/1988 | Wagner |
| 4,821,376 A | 4/1989 | Sandberg |
| 4,872,241 A | 10/1989 | Lindee |
| 4,975,039 A | 12/1990 | Dare et al. |
| 4,987,643 A | 1/1991 | Powers et al. |
| 4,996,743 A | 3/1991 | Janssen |
| 5,022,888 A | 6/1991 | Lindee |
| 5,037,350 A | 8/1991 | Richardson |
| 5,149,298 A | 9/1992 | Lindee |
| 5,618,571 A | 4/1997 | London |
| 5,725,891 A | 3/1998 | Reid, Jr. |
| 5,730,650 A | 3/1998 | Soper |
| 5,795,610 A | 8/1998 | London |
| 6,132,199 A | 10/2000 | Chierici |
| 6,368,092 B1 | 4/2002 | Lindee |
| 6,416,314 B1 | 7/2002 | LaBruno |
| 6,428,303 B2 | 8/2002 | Lindee |
| 6,454,559 B1 | 9/2002 | Lindee |
| 6,517,340 B2 | 2/2003 | Sandberg |
| 6,572,360 B1 | 6/2003 | Buhlke et al. |
| 2002/0160089 A1 | 10/2002 | Cowart |
| 2002/0182297 A1 | 12/2002 | Buhlke et al. |

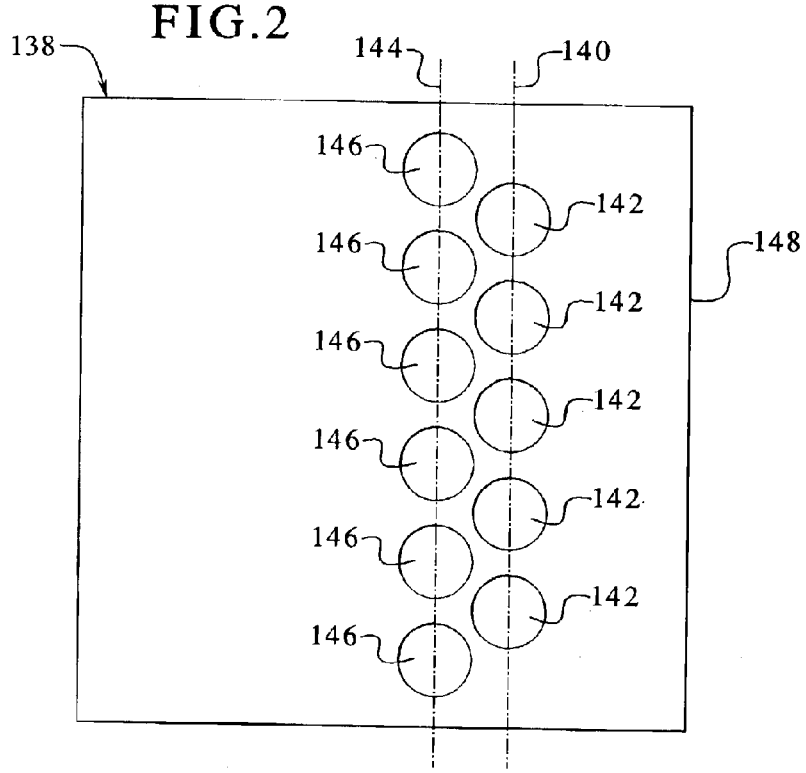
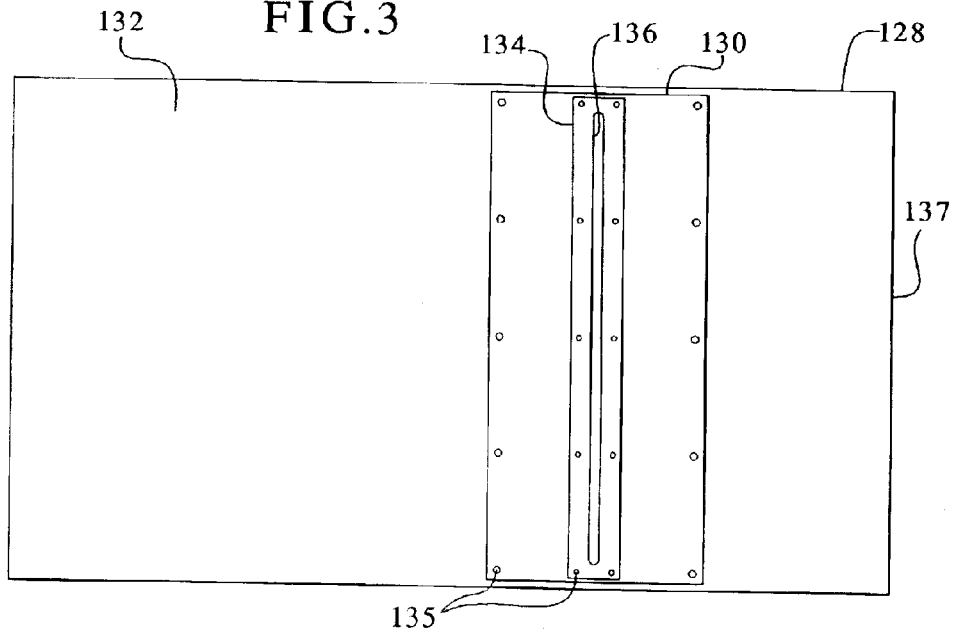

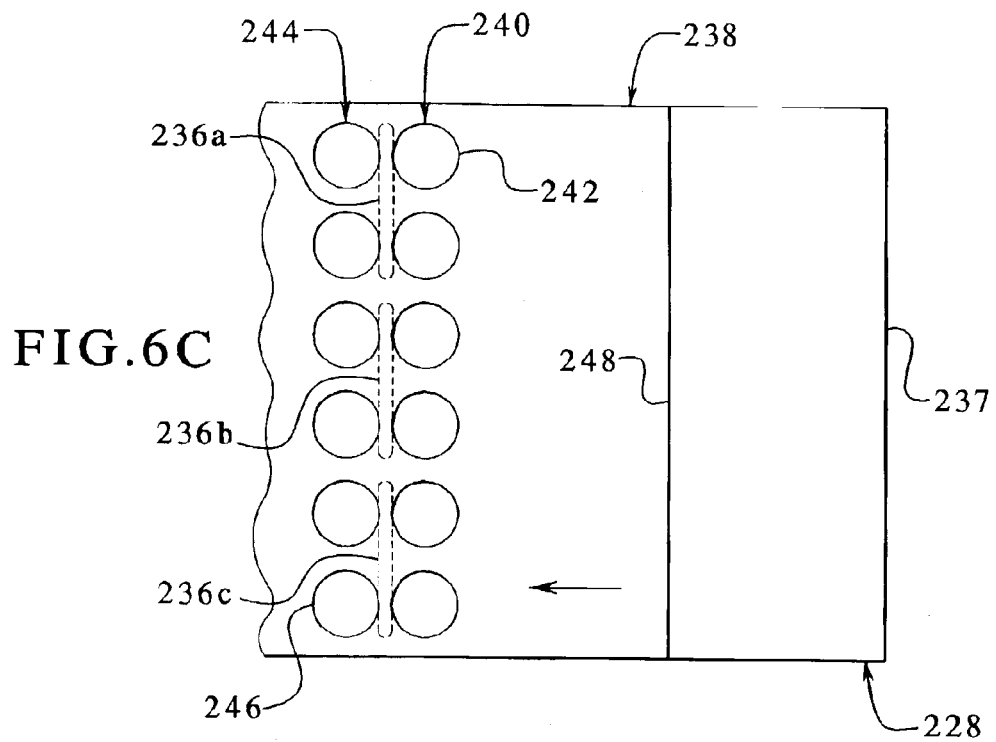
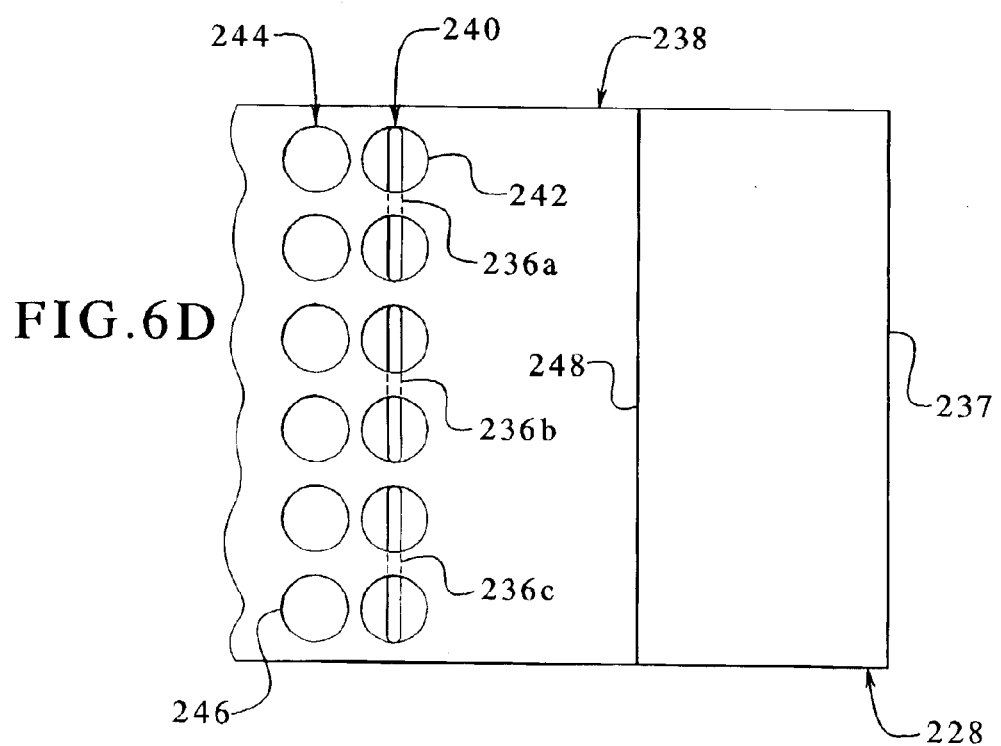

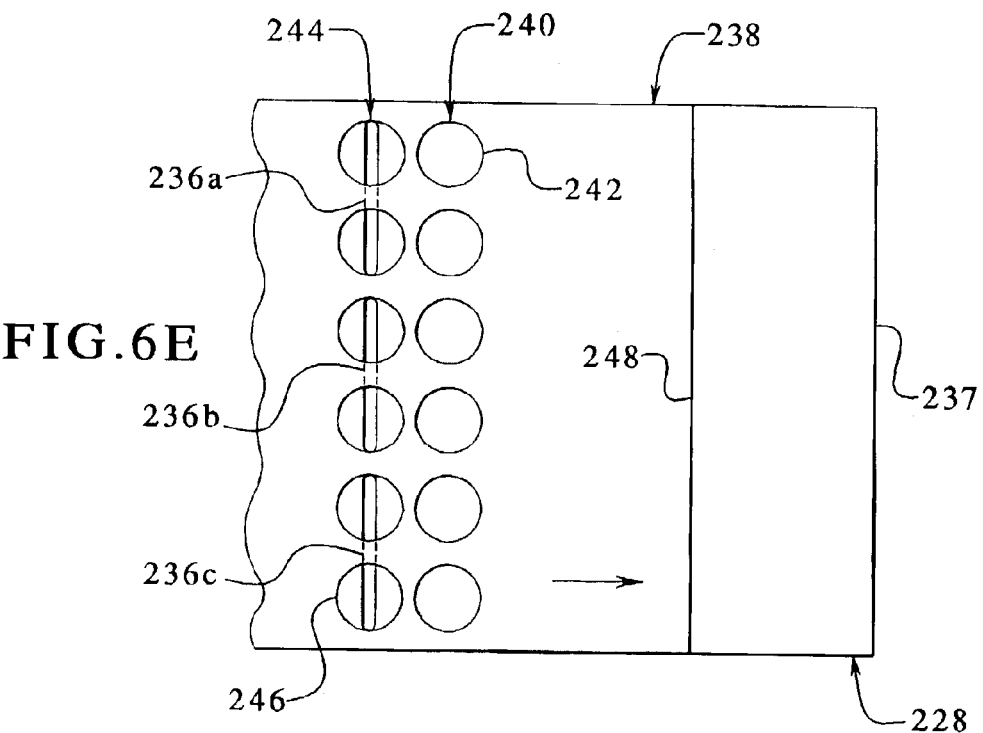
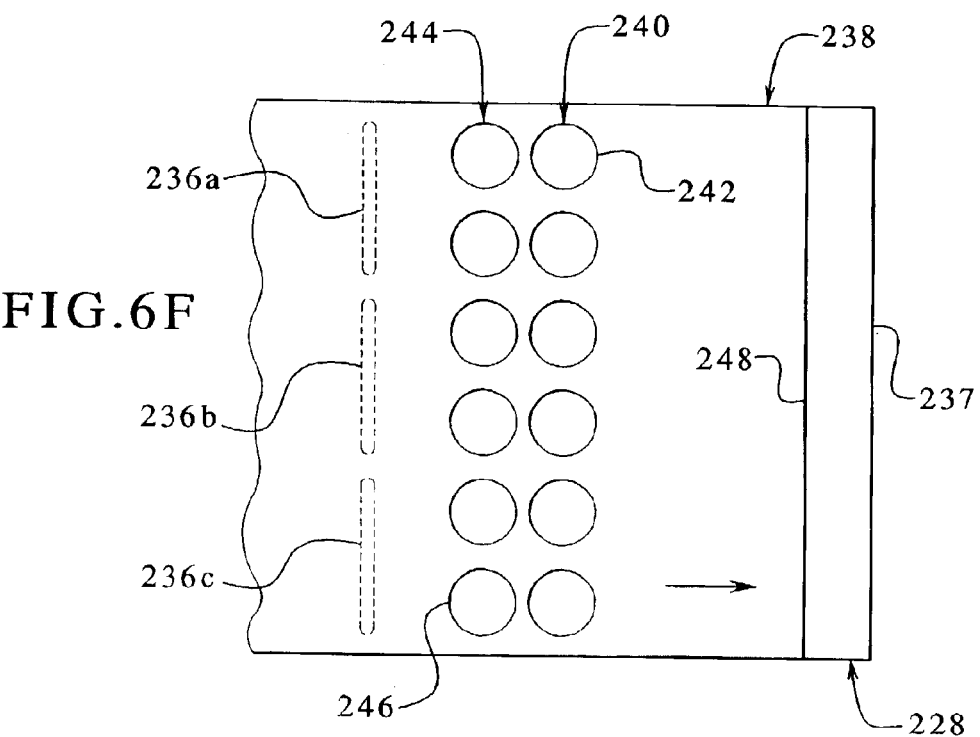

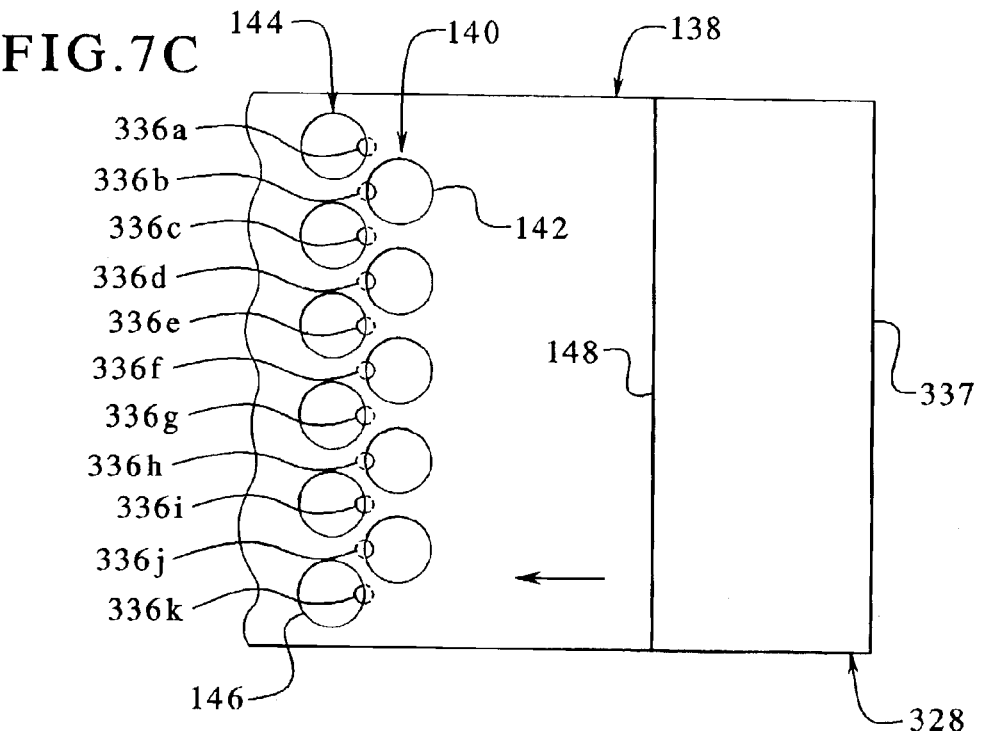
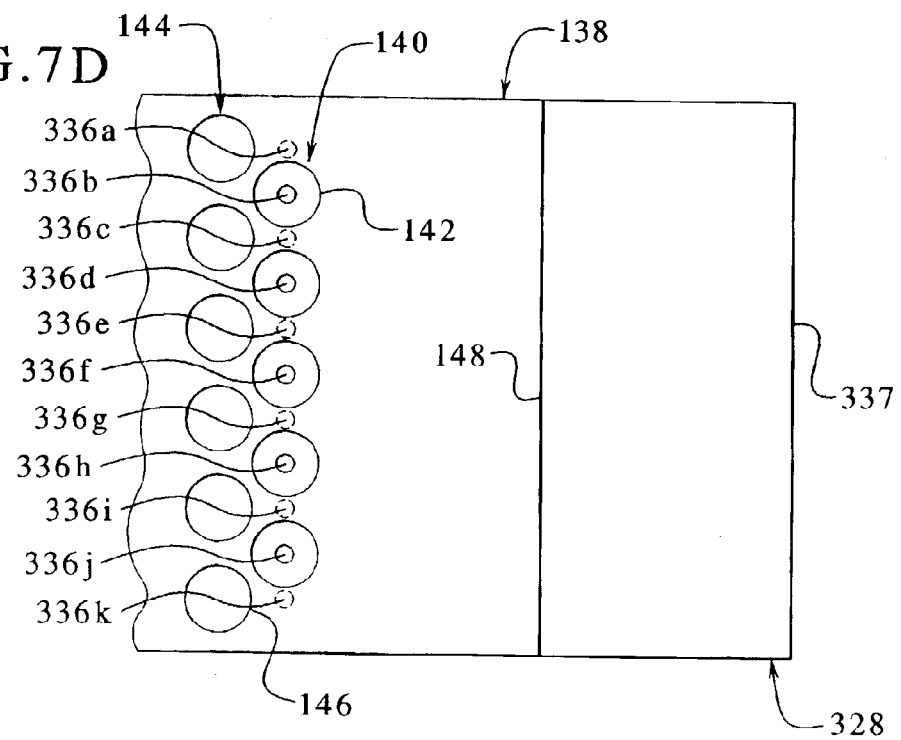

METHOD FOR FORMING MULTIPLE ROWS OF MEAT PATTIES

PRIORITY CLAIM

This application is a divisional application of U.S. patent application Ser. No. 09/881,483, filed on Jun. 14, 2001, now U.S. Pat. No. 6,592,359 entitled, "MULTIPLE ROW MEAT PATTY FORMING APPARATUS AND METHOD",

CROSS REFERENCE TO RELATED APPLICATION

The present invention relates to a U.S. application Ser. No. 09/593,466, filed on Jun. 14, 2000, entitled Device for Producing Ground Meat Patties of Beef and/or Pork, assigned to the assignee of this application.

DESCRIPTION

The present invention relates in general to a meat patty forming apparatus, and more particularly to an apparatus and method for forming meat patties using a mold plate.

BACKGROUND OF THE INVENTION

Typically, central meat forming manufacturing locations employ high volume, high speed automated molding machines to form different shapes and sizes of meat patties, including hamburger, steak, fish, poultry and pork patties. The manufacturers distribute the patties to restaurants, grocery stores and other retail outlets. In the high volume machines, a supply hopper feeds raw meat into a food pump that pumps the meat, under pressure, into a mold cavity of a mold plate. The mold cavity is typically one or more holes extending completely through the plate. The mold plate is moved cyclically from a fill or form patty position to a discharge or stamp patty position and back to the fill position, etc.

One complete fill position to discharge position to fill position cycle is commonly referred to as a stroke. Manufacturers typically run the molding machines at sixty to ninety strokes per minute. This means that the machine stamps out one or more patties sixty to ninety times a minute. To increase production, the manufacturer can run the machine at a higher speed. To save wear and tear on the machine, however, the manufacturer desires to run the machine at a lower speed. Increasing or decreasing the stroke rate therefore creates a tradeoff of benefits.

Another solution for increasing production is to increase the number of patties that the machine stamps out upon each stroke. Increasing the number of patties per stroke requires more cavities in the mold plate. Since many or most meat patty forming operations employ forming machines having a single row of cavities, existing forming machines are modified to have or new machines are obtained having multiple rows of cavities in the mold plate.

Operating a multiple row forming machine presents new challenges to manufacturers accustomed to the single row machines. One difficulty that the multiple row machines present involves the fill portion of the cycle described above. With single row machines, each patty forming cavity passing across a fill slot receives the same amount of fill time. With multiple row machines, achieving equal filling time is more difficult, and may not be possible in a retrofitted machine. Since forming machines are expensive, however, it is desirable to modify existing equipment, if possible, to achieve multiple row forming. Accordingly, a need exists for an apparatus and method to efficiently operate and evenly fill the cavities of a retrofitted or new multiple row meat patty forming machine.

SUMMARY OF THE INVENTION

The present invention generally provides an improved meat patty forming apparatus and method of operating the same. More particularly, the present invention provides an improved apparatus and method for forming meat patties using a mold plate having multiple rows or groups of patty forming cavities. An existing single row forming machine is modified by moving the fill slot relative to the existing stroke length so that the fill slot comes in contact or fluidly communicates with a newly added row of cavities. This is most easily achieved by modifying the existing fill plate and by adding cavities to the existing mold plate, so that the combination of modified plates operates with the existing stroke length (which is difficult to change), to produce multiple rows of consistent meat patties.

The plates are modified so that the mold plate slidingly engages the fill plate when the fill plate is in fluid communication with pressurized meat contained in a fill passage. The mold plate defines at least two rows or groups of cavities. At least one of the rows or groups includes a plurality of cavities and preferably each of the rows or groups includes a plurality of cavities. The fill plate, which may include one or more removable inserts, includes at least one slot that is adapted to fluidly engage a plurality of cavities and preferably includes a single slot that is adapted to fluidly engage each cavity, as the mold plate slides across the fill plate. The elongated slot, which fills a plurality of cavities, provides for a steady, uniform flow of meat into the cavities and consequently results in consistent meat patties. This is true for retrofitted as well as new machines.

In one embodiment, the multiple row meat patty forming apparatus includes a mold plate that has a plurality of staggered rows of patty forming cavities. A fill plate slidingly engages a surface of the mold plate. The fill plate defines a slot that is adapted to fluidly engage at least two cavities of the same row when the mold plate slides across the fill plate. A fill passage disposed on the opposite side of the fill plate from the mold plate allows pressurized meat to flow through the slot and into the plurality of cavities. The forming apparatus of this embodiment may be adapted to have two or more fill plate slots of the same row individually engage any number of cavities or, preferably, to have a single slot fluidly engage each cavity of a row in the mold plate.

When the mold plate of this embodiment has two rows, they may be spaced apart and the slot may be dimensioned, such that the slot fluidly engages each cavity of the two rows at one time when the mold plate slides against the fill plate. That is, the rows are closely spaced apart and the slot is wide enough, such that at a single point in time as the mold plate passes across the fill plate, a portion of each cavity of both rows fluidly communicates with the slot. The mold plate of this embodiment may be adapted to provide one cavity having a larger open area than another cavity. It also may be adapted so that the cavities of one row have a larger open area than the cavities of another row.

In another embodiment, the multiple row meat patty forming apparatus includes a mold plate that has a plurality of staggered rows of patty forming cavities. A fill plate slidingly engages a surface of the mold plate. The fill plate in this embodiment defines a single row of slots so that each cavity is adapted to fluidly engage a unique slot when the mold plate slides across the fill plate. A fill passage disposed on the opposite side of the fill plate from the mold plate allows pressurized meat to flow through the slots and into the plurality of cavities. In this embodiment, a single row of slots fluidly engages staggered rows of cavities at different times as the mold plate moves across the fill plate. Each cavity fluidly engages a unique slot.

In a further embodiment, the multiple row meat patty forming apparatus includes a mold plate that has a plurality of stacked rows of patty forming cavities. A fill plate slidingly engages a surface of the mold plate. The fill plate defines a slot that is adapted to fluidly engage at least two cavities of the same row when the mold plate slides across the fill plate. A fill passage disposed on the opposite side of the fill plate from the mold plate allows pressurized meat to flow through the slot and into the plurality of cavities. This embodiment includes stacked rather than staggered groups or rows of cavities.

The forming apparatus of this embodiment may be adapted to have a plurality of fill plate slots, which individually or in some combination fluidly engage each cavity or, preferably, to have a single slot fluidly engaging each cavity in a row of the mold plate when the mold plate slides against the fill plate. The forming apparatus also includes a breather plate slidingly engaging the surface of the mold plate opposite to the surface engaged by the fill plate, wherein the breather plate has at least one orifice in fluid communication with a cavity.

The mold plate of this embodiment may also be adapted to include one cavity having a larger open area than another cavity. It may also be adapted to include the cavities of one row having a larger open area than the cavities of another row.

One method of operating a multiple row meat patty forming apparatus includes sliding a row of cavities defined by a mold plate into fluid communication with a slot defined by a fill plate, wherein the fill plate contacts pressurized meat. In the same direction, sliding a cavity not in the row into fluid communication with the slot. Reversing direction and sliding the cavity not in the row while in fluid communication with the slot. In the reversed direction sliding the row of cavities into fluid communication with the slot. This method includes sliding a plurality of or a row of cavities followed by one or more cavities in a mold plate across a slot, reversing the motion, and sliding the mold plate in the opposite direction. This method enables one or more cavities to pass partially or completely across the slot.

This method further includes the step of holding the different cavity in fluid communication with the slot for a predetermined amount of time before changing direction. The dwell time enables one or more cavities, if only partially engaged by the fill slot, to obtain the appropriate amount of meat.

Another method of operating a multiple row meat patty forming apparatus includes sliding a first cavity defined by a mold plate into fluid communication with a slot defined by a fill plate, wherein the fill plate contacts pressurized meat. In the same direction, sliding a row of cavities defined by the mold plate into fluid communication with the slot. Reversing direction and sliding the row of cavities while in fluid communication with the slot. In the reversed direction, sliding the first cavity into fluid communication with the slot. This method includes sliding one or more cavities followed by a plurality or a row of cavities in a mold plate across a slot, reversing the motion, and sliding the mold plate in the opposite direction. This method also enables the plurality or row of cavities to partially pass across the slot and further includes the step of holding the plurality or row of cavities in fluid communication with the slot for a predetermined amount of time before changing direction.

A further method of operating a multiple row meat patty forming apparatus includes sliding a first row of cavities defined by a mold plate into fluid communication with a first set of slots from a row of slots defined by a fill plate, wherein the fill plate contacts pressurized meat. In the same direction, sliding a second row of cavities into fluid communication with a second set of slots from the row. Reversing direction and sliding the second row of cavities while in fluid communication with the second set of slots. In the reversed direction, sliding the first row of cavities into fluid communication with the first set of slots. This method includes a plurality of cavities individually or in some combination slidingly engaging a plurality of slots. This method also enables the second plurality of cavities to partially pass across the slots.

It is therefore an advantage of the present invention that an existing single row forming machine is readily modified to produce multiple rows of meat patties.

Another advantage of the present invention is that a slot fluidly communicates with a plurality of rows of cavities and thereby increases production.

A further advantage of the present invention is that the mold plate includes having very closely spaced apart cavities so that meat patties are efficiently placed on a conveyor belt exiting the forming machine.

Yet another advantage of the present invention is that a plurality of cavities can partially pass across the slot and thereby save stroke time and stroke length for a retrofitted or a new forming machine.

Yet a further advantage of the present invention is that a single fill slot fills a plurality of cavities, which provides for a steadier flow of meat into the cavities and ultimately for more consistent meat patties.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 2 is a top plan view of one preferred mold plate of the present invention;

FIG. 3 is a top plan view of one preferred fill plate of the present invention;

FIGS. 6A through 6F illustrate one method of filling cavities using alternative multiple fill slots; and FIGS. 7A through 7F illustrate another method of filling cavities using alternative multiple fill slots.

DETAILED DESCRIPTION OF THE INVENTION

Figure 1A:
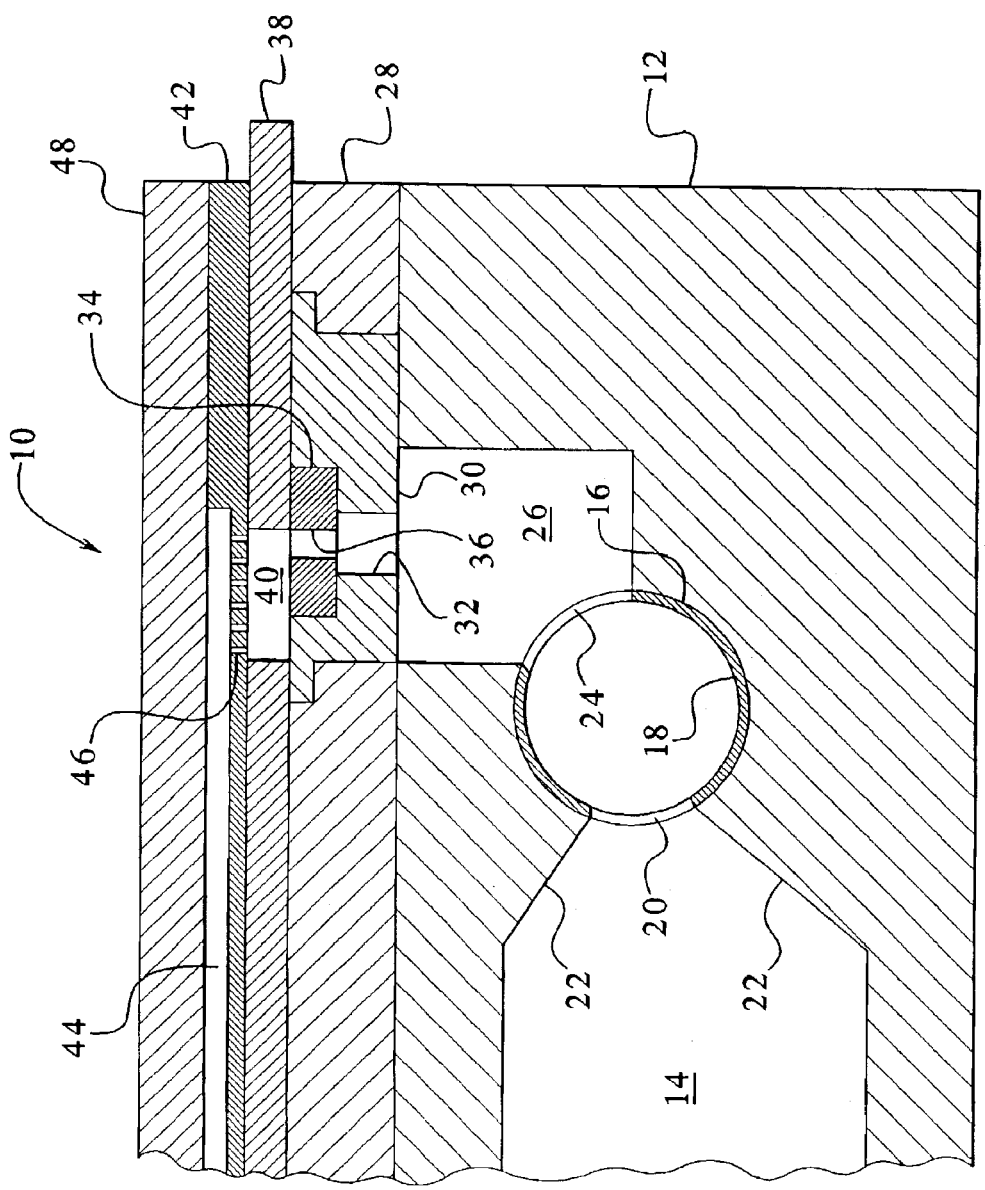
FIG. 1A is a fragmentary elevation sectional view of a molding machine having a single row meat forming apparatus.

Referring now to the drawings and in particular to FIG. 1A, a section of a molding machine 10 illustrates a single row meat forming apparatus. A pump box 12 defines an inlet chamber 14 into which a food pump (not illustrated) pumps meat including hamburger, steak, fish, poultry, pork patties and other fibrous foods. The pump box 12 defines an opening 16 into which a valve cylinder 18 fits. The valve cylinder 18 includes an intake slot 20 that aligns with an output orifice defined by the walls 22 of the inlet chamber 14. The valve cylinder 18 also includes an outlet slot 24 that aligns with a fill passage 26 defined by the pump box 12. The valve cylinder 18 is enabled to rotate and close off the inlet chamber 14 from the fill passage 26.

A fill plate 28 covers the top of the pump box 12, including a portion of the fill passage 26. The fill plate includes a fill slot adapter 30, which preferably extends across the width of the conveyer of the molding machine 10. The fill slot adapter 30 defines an elongated aperture 32 that extends substantially across the entire width of the fill slot adapter 30. A fill slot insert 34 fits inside the aperture 32 and also extends substantially across the width of the conveyer of the molding machine 10. The fill slot insert 34 defines at least one fill slot 36, which is discussed in detail below.

This configuration of the molding machine 10 allows for flexibility in molding different types of fibrous meats. The manufacturer can maintain different fill slot adapters 30 and thereby fill at different points relative to the travel of the mold plate 38. A different fill slot adapter 30 also includes having a plurality of apertures 32 and thus a plurality of fill points. The manufacturer can also maintain different fill slot inserts 34. For any fill slot adapter 30, the different fill slot inserts 34 provide different fill slot 36 arrangements, preferably corresponding to different mold plates 38, as described in detail below. It should be appreciated that the fill slot adapter 30 and the fill slot insert 34 are optional and that the present invention is operable by simply forming one or more fill slots 36 in the fill plate 28. For the purposes of describing this invention "fill plate" includes none, one or both the fill slot adapter 30 and the fill slot insert 34, and in any case, defines one or more fill slots 36.

Figure 1B:
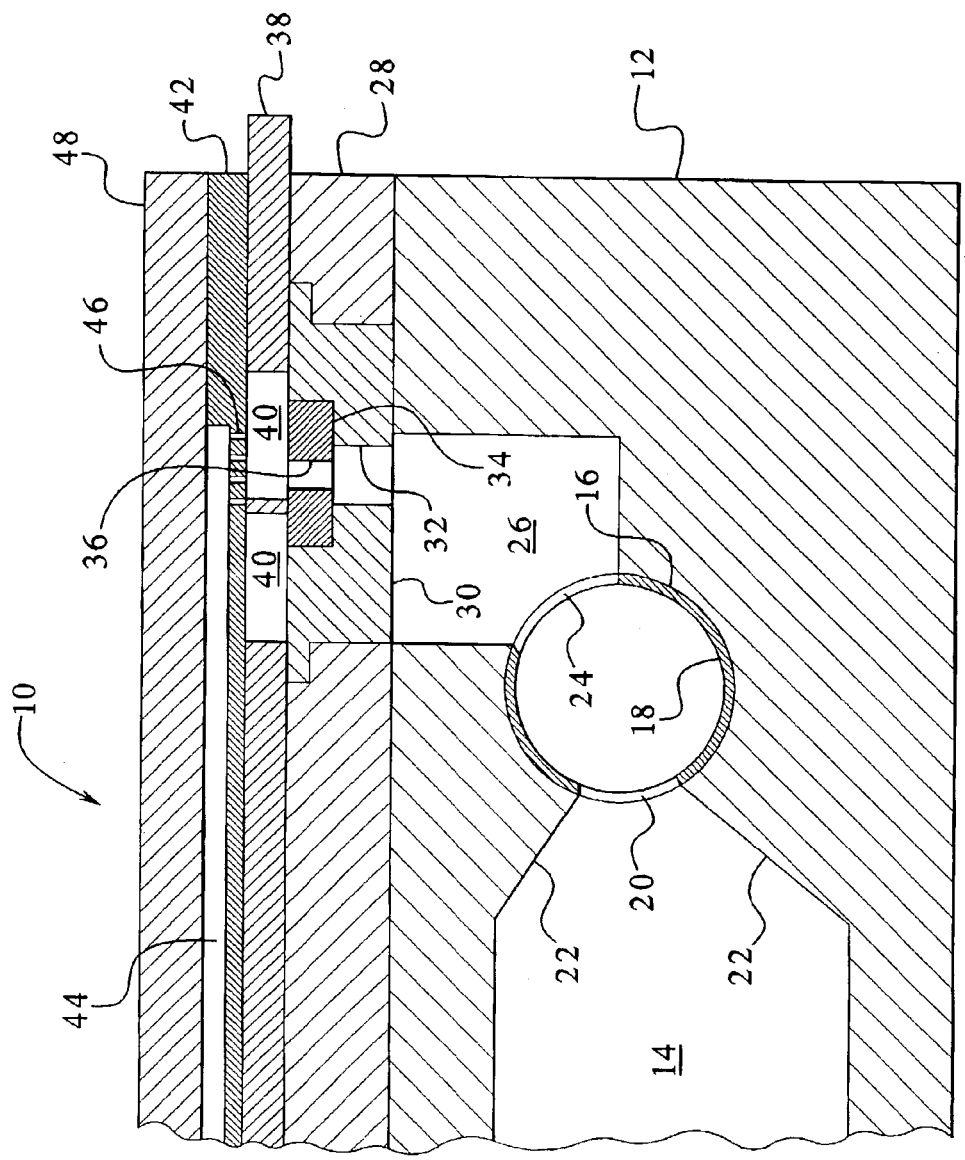
FIG. 1B is a fragmentary elevation sectional view of a modified molding machine having one embodiment of the multiple row meat forming apparatus of the present invention.

The fill plate 28 slideably supports the mold plate 38, whereby the mold plate 38 is enabled to slide lengthwise along the fill plate 28 (i.e., left and right in FIGS. 1A and 1B). As stated above, the mold plate 38 is cyclically, slideably moveable from a fill position to a discharge or knockout position. The drive apparatus for sliding the mold plate 38 is not illustrated, nor is the discharge or knockout apparatus, as these are well known and not relevant to the scope of this invention, except that the manufacturer or the machine builder must add or modify knockout cups so that there is one for each new meat patty cavity. The mold plate 38 defines rows or groups of cavities 40. The cavities 40 have any desired meat patty shape and are shown simplistically in this description as having a circular meat patty shape.

The cavities 40 preferably extend through the mold plate 38, so that a stamping apparatus, located above the mold plate 38, can stamp meat patties onto a conveyor belt located below the mold plate. A breather plate 42 sits above and slideably engages the mold plate 38. The breather plate 42 includes at least one air pressure release passage 44, wherein a plurality of small breather holes 46 enable the cavities 40 of the mold plate 38 to fluidly communicate with the passage 44. The air passage 44 enables air in the cavities to escape as the machine 10 pumps the cavities full of meat. A cover plate 48 sits above the breather plate 42 and its associated passage 44. It should be appreciated that while the molding machine 10 is illustrated with the pump box 12 below the forming plates, the present invention includes the pump box 12 being above the forming plates and thereby feeding meat down onto a fill plate 28 that slidingly engages the mold plate 38 on the fill plate's lower surface, wherein the breather plate 42 is disposed below the mold plate 38, etc.

In either configuration, when the valve 18 is open, fluid communication exists between the inlet chamber 14, intake and outlet slots 20 and 24, respectively, the fill passage 26, the fill slot adapter aperture 32 and the slot 36 (or simply the slot 36 in the fill plate 28), one or more cavities 40, depending on the sliding position of the mold plate, and the release passage 44/breather hole 46 combination, assuming at least one cavity 40 is in a fill position. That is, the pump is enabled to pump meat into the inlet chamber 14, out of the slot 36 and into a mold cavity 40 when the mold plate is in a fill position. If the pump pressure extrudes meat through the breather holes 46, the meat collects in the release passage 44, whereby an operator slides the loose meat back into a meat hopper (not illustrated).

In FIG. 1A, the molding or forming machine 10 as configured is constrained to one row of cavities 40. If a second row of cavities is machined in the mold plate in back of (to the left of in FIG. 1A) the existing row indicated by the illustrated cavity 40, the outlet of the stroke (which pushes the mold plate 38 to the right in FIG. 1A) is not long enough so that the new cavities would reach a stamping device (not illustrated) set to the right of the forming machine 10. If the second row of cavities 40 is machined in the mold plate in front of (to the right of in FIG. 1A) the existing row, the inlet of the stroke (pushing plate 38 to the left) is not long enough so that the new cavities would reach the fill slot 36.

The machine configuration of FIG. 1A, which in one embodiment is a standard model F-26 machine made by Formax, Inc. of Mokena, Ill., is not operable with a mold plate having multiple rows of meat patty forming cavities. It is very difficult to change the stroke length on these types of machines. Moreover, longer stroke lengths for a given speed result in less production. It is also very difficult to move the patty stamping device given the configuration of the forming machine 10 in relation to an output conveyor that carries away stamped patties to a freezer.

Referring now to FIG. 1B, the existing forming machine 10 is economically adapted to form multiple rows of meat forming patties as illustrated in one embodiment of the present invention. By moving the fill slot 36 defined by the fill plate 28 towards the outlet end (to the right in FIG. 1B) of the molding machine 10, two rows of cavities 40 in the mold plate 38 are able to fluidly communicate with the fill slot 36. In the Formax machine, this modification involves machining a new fill slot adapter 30, so that the fill slot insert 34, defining the fill slot 36, mounts further towards the outlet end of the machine 10. The fill slot adapter 30 must be adapted so that it still fluidly communicates with the existing fill passage 26 defined by the pump box 12.

A completely new mold plate can be made with a number of rows of cavities 40, e.g., two rows, positioned so that the new fill slot 36 fluidly communicates with both cavity rows during the stroke. Alternatively, the existing mold plate 38 can be modified by adding second, third, etc., rows of cavities 40 in front (to the right of) the existing row, so that new fill slot 36 fluidly communicates with each added row. Further, the breather plate 42 may need to be modified so that breather holes 46 reside above the new fill slot 36.

Since the Formax machine is a very popular and reliable machine, the modifications as disclosed will likely apply to many existing meat patty forming operations. The present invention, however, applies to any existing forming machine, wherein the fill slot is moveable to communicate with a plurality of rows of meat patty forming cavities. In machines not having an adapter 30 or an insert 34, only the mold plate 38 needs to be modified. Typically, the fill slot 36 is moved towards the outlet end of the machine, i.e., towards the middle of the stroke cycle, to communicate with a new one or more rows of cavities machined into the mold plate 38. The present invention is not limited to two rows of cavities 40 but is constrained by the stroke length, the size of the cavities and size limitations inherent in the stamping device.

As described below, advantages derived from the interface between the fill plate 28 and the mold plate 38 of the present invention apply to all retrofitted and new forming machines 10. It should be understood, therefore, that the present invention includes both existing and new forming machines 10.

Referring now to FIG. 2, one preferred mold plate 138 of the present invention is illustrated having a plurality of rows of mold cavities. A "row" for purposes of this invention means a single cavity, a plurality of cavities, a group of cavities or a set of cavities that fluidly communicates with one or more fill slots 36 (FIGS. 1A and 1B), when the mold plate 138 is in motion, before another single cavity, plurality of cavities, group of cavities or set of cavities fluidly communicates with the same slot or slots 36. A row may be adapted to have one or more of the cavities. A row is preferably a straight line of cavities having a centerline parallel to a front edge 148 of the plate 138. A row may, however, have certain cavities that are slightly staggered or off center, so that not every same sized cavity begins fluidly communicating with one or more fill slots 36 at the same time.

In one preferred embodiment, the mold plate 138 includes a front row 140 of cavities 142 along a first centerline and a rear row 144 of cavities 146 along a second centerline. The rows 140 and 144 each preferably have straight centerlines that are substantially parallel with the front edge 148 of the plate 138. The cavities 146 of the rear row 144 are staggered in between, and preferably halfway between, the cavities 142 of the front row 140. As illustrated below, the rows in another embodiment are stacked rather than staggered. In the preferred embodiment of FIG. 2, the cavities 142 of the front row 140 are slightly bigger than the cavities 146 of the rear row 144. It should be appreciated that a very small difference in diameter makes a significant difference in the amount of meat received by the cavities. To facilitate equal filling of the cavities, the mold plate 138 includes: (i) any cavity, including a cavity of the same row, being a different size than any other cavity and (ii) any row of cavities having different sized cavities than another row.

The mold plate is adaptable to have any number of rows greater than one. The two rows of the preferred plate 138 include five cavities 142 in the front row 140 and six cavities 146 in the rear row 144. To facilitate a desired number of patties discharged at the knockout portion of the cycle, the mold plate is adaptable to provide any number of cavities in each row. In one simple embodiment, the mold plate 138 defines a single cavity in the front or rear row, which is staggered or stacked next to two cavities of the rear or front row, respectively. When the mold plate 138 has staggered rows, either the front row or the rear row can have the greater number of cavities. The mold plate is further adaptable to have a mix of staggered and stacked rows.

As stated above, the mold plate is adaptable to define any shaped cavity. In FIG. 2, the cavities 142 and 146 of the mold plate 138 are each substantially circular. The circular or round cavities are employed to make hamburger, fish, chicken and other patties. Other shapes may be employed for pork, etc. Different shapes may exist in a single row. Different rows are further adaptable to have different shaped cavities.

Referring now to FIG. 3, one preferred fill plate 128 of the present invention is illustrated as having an adjustable fill slot 136. The preferred fill plate includes a fill slot adapter 130, which flush mounts inside the fill plate 128, such that the top surface 132 of the fill plate is substantially flat and smooth. A fill slot insert 134 flush mounts inside the fill slot adapter 130 and defines the preferred elongated fill slot 136, which enables fluid communication between the fill passage 26 (FIGS. 1A and 1B) and the cavities 142 and 146, (FIG. 2). Attachment devices 135, such as threaded holes or nuts that receive preferably countersunk bolts or screws, fixedly and removably attach the fill slot adapter 130 to the fill plate 128 and the fill slot insert 134 to the fill slot adapter 130.

Different fill slot adapters 130 enable the operator to fix the fill slot 136 in different places with respect to the front edge 137 of the fill plate 128. Different fill slot inserts 134 enable the operator to install one or more wider or narrower slots of varying end shapes such as rounded ends or squared ends. The preferred fill slot 136 is a single slot having a width that is between five and forty percent of the diameter of the cavities 142 and 146. The length of the slot is preferably, substantially the same as the widest row of cavities of the mold plate, e.g., the row 144 of the mold plate 128. As described above, the fill slot adapter 130 and the fill slot insert 134 are preferred but not required, and the fill plate 128 alternatively is a single metallic structure that defines the fill slot 136. In any case, the fill plate 128 contains the fill slot 136, and for purposes of this invention, the fill plate 128 defines the fill slot 136.

Referring now to FIGS. 4A through 4F, one preferred apparatus and method of filling a multiple cavity mold plate is schematically illustrated. For the purpose of illustration, the actual movement of meat is not shown. It should be understood by those skilled in the art, however, that when fluid communication exists between a cavity and a slot, i.e., when the cavities pass over or under the slot, the pump extrudes pressurized meat from the fill passage 26 (FIGS. 1A and 1B), through the slot, and into the cavity.

Figure 4A:
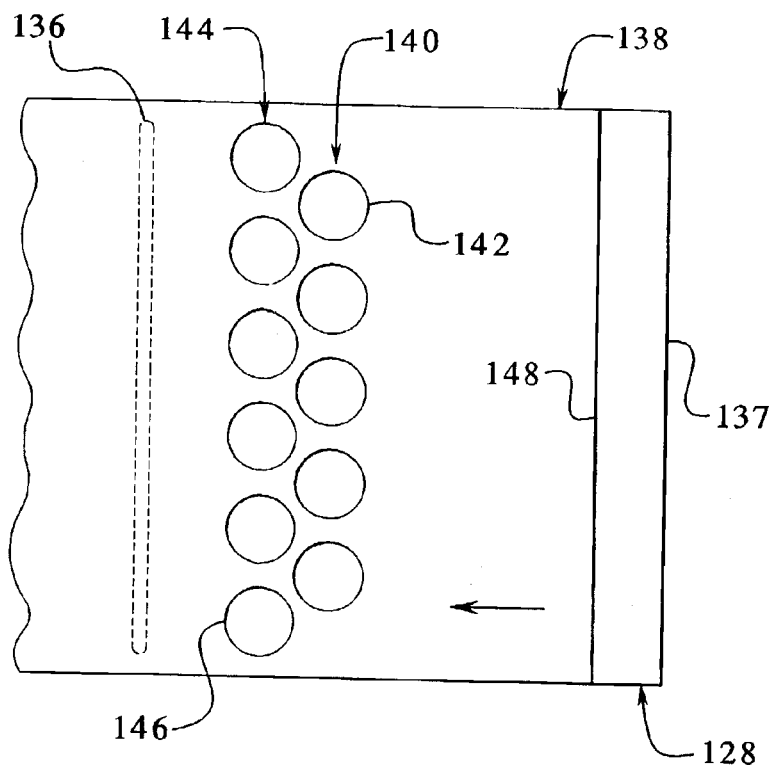
FIGS. 4A through 4F illustrate one method of filling the preferred multiple staggered rows of patty making cavities.

FIG. 4A includes the preferred mold plate 138 and the preferred fill plate 128 as described above. The mold plate 138 includes the front edge 148, the front row 140 of cavities 142 and the staggered rear row 144 of cavities 146. The fill plate 128 includes the front edge 137 and defines the elongated slot 136, which preferably extends from outer edge to outer edge of the outside cavities 146 of the larger rear row 144. The fill plate 128, in this example, slidingly engages the mold plate 138 beneath the mold plate 138, so that the slot 136 is hidden and appears in phantom. When the slot 136 fluidly engages the cavities, e.g., slides underneath, signaling the flow of meat into the cavities, the slot appears in solid line type. The mold plate 138 moves in the direction indicated by the arrow with respect to the stationary fill plate 128. In FIG. 4A, at a first point in time, the cavities of the rows 140 and 144 of the moving mold plate 138 are returning from the patty discharge portion of the cycle, are empty and have yet to reach the fill slot 136 of the fill plate 128.

Figure 4B:
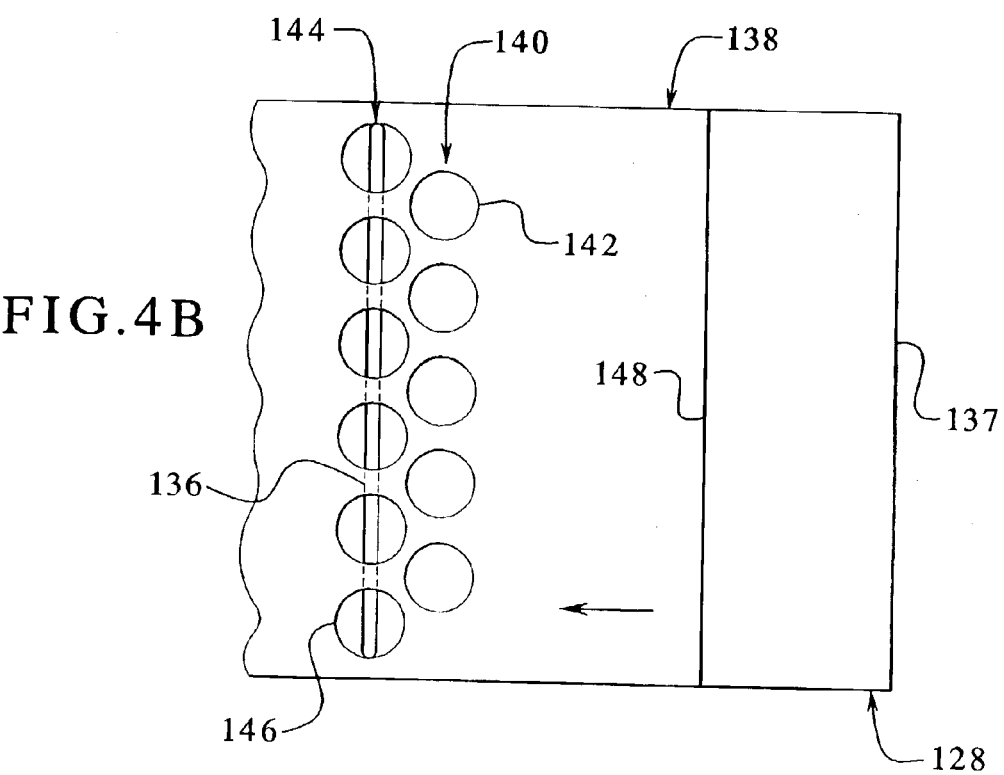

Referring to FIG. 4B, at a second point in time, the rear row 144 of cavities 146 of the moving mold plate 138 has reached the slot 136, fluid communication exists between the slot 136 and the cavities 146 and meat flows from the pressurized fill passage 26 (FIGS. 1A and 1B) into the cavities 146. The cavities 142 of the front row 140 are not yet in fluid communication with the slot 136.

Figure 4C:
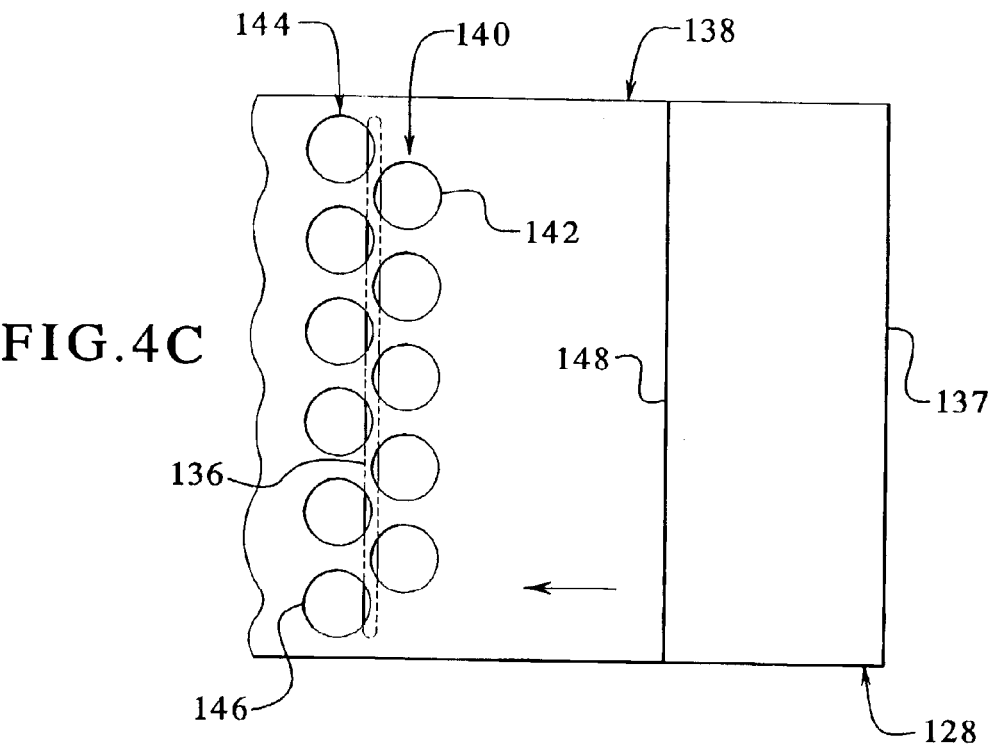

Referring now to FIG. 4C, at a third point in time, both the rear row 144 of cavities 146 and the front row 140 of cavities 142 have reached the slot 136, whereby for an instant, fluid communication exists between the slot 136 and each of the cavities of the mold plate 138. In this instant, meat flows from the pressurized fill passage 26 into each of the cavities. The preferred apparatus includes the rows 140 and 144 of the mold plate 138 being closely positioned and the slot 136 being wide enough, such that this situation occurs. It has been found that closely spacing staggered rows of cavities enables more meat patties to fit onto a given section of a conveyor belt than closely spacing stacked rows of meat patties. Alternatively, the cavity positioning and the slot width combination does not enable fluid communication to exist between the slot 136 and each of the cavities.

Figure 4D:
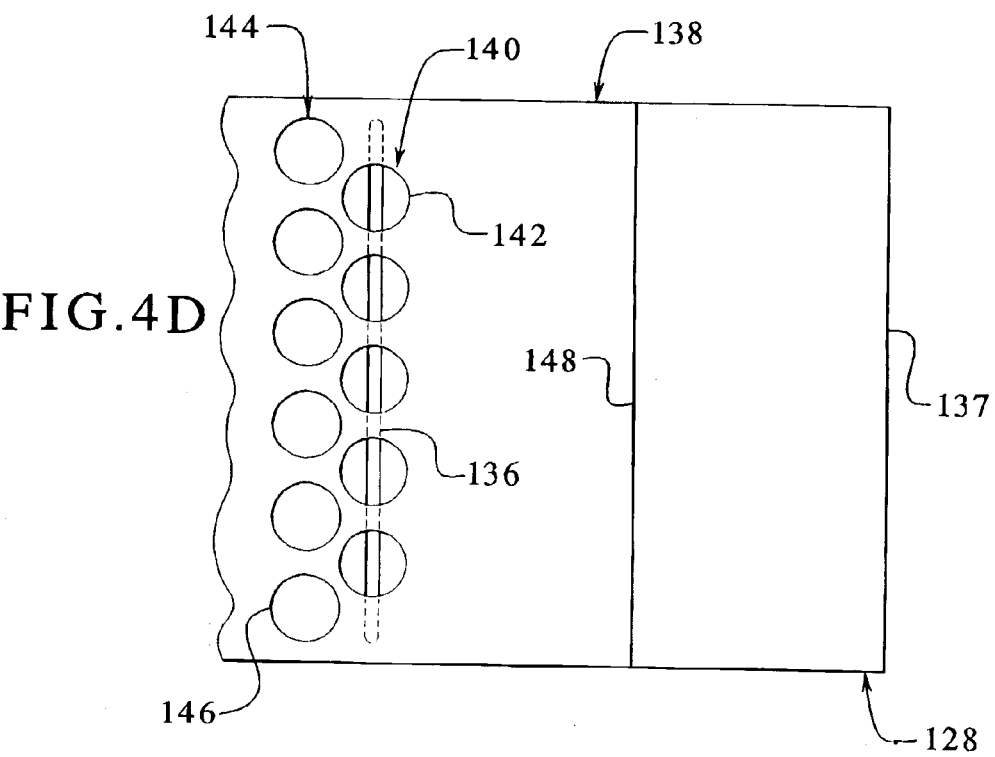

Referring to FIG. 4D, at a fourth point in time, the mold plate 138 has moved such that the back row 144 of cavities 146 has slid completely past or has cleared the slot 136. The cavities 146 are thus not receiving meat and may or may not be completely full of meat. The mold plate 138 has moved to its maximum point of travel in the fill portion of the cycle and has come to rest (no arrow illustrated), so that the center of the slot 136 is partially through and fluidly engaging the front row 140 of cavities 142. A forming machine retrofitted for multiple row cavity filling may limit the maximum point of travel through the front row 140 of cavities 142. It has been found that consistent front row meat patties may be formed when the fill slot 136 reaches midway through the back one third of the front row 140 (i.e., approximately 16.7%). It should be appreciated however that consistency may be improved when the slot travels substantially through or completely clears or passes by each of the cavities 142 of the front row 140. The present invention includes each of these implementations.

The present invention includes decelerating the mold plate to a stop virtually instantaneously, at a predetermined rate or at a plurality of predetermined deceleration rates. In many existing machines, mechanical linkages driven by a motor rotating a shaft in a single rotational direction cause the mold plate 138 to stroke back and forth. In any case, a dwell time, wherein the mold plate has zero velocity, and wherein the slot 136 is positioned under the front row 140 exists so that pressurized meat has a brief amount of additional time to fill the cavities 142 of the front row 140.

Figure 4E:
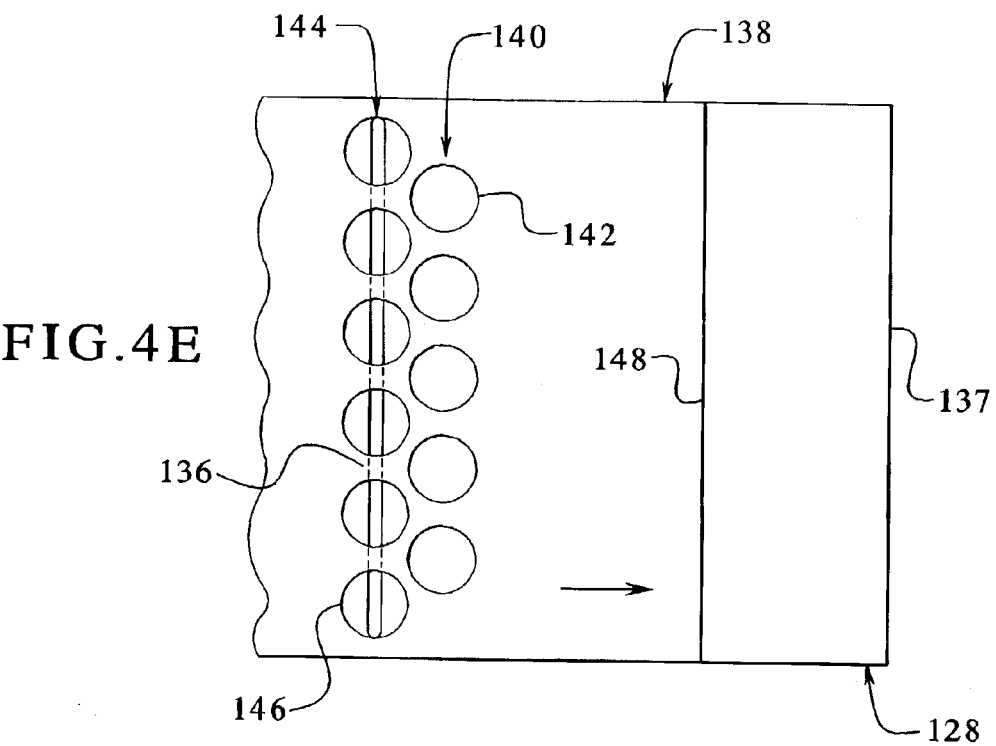
Figure 4F:
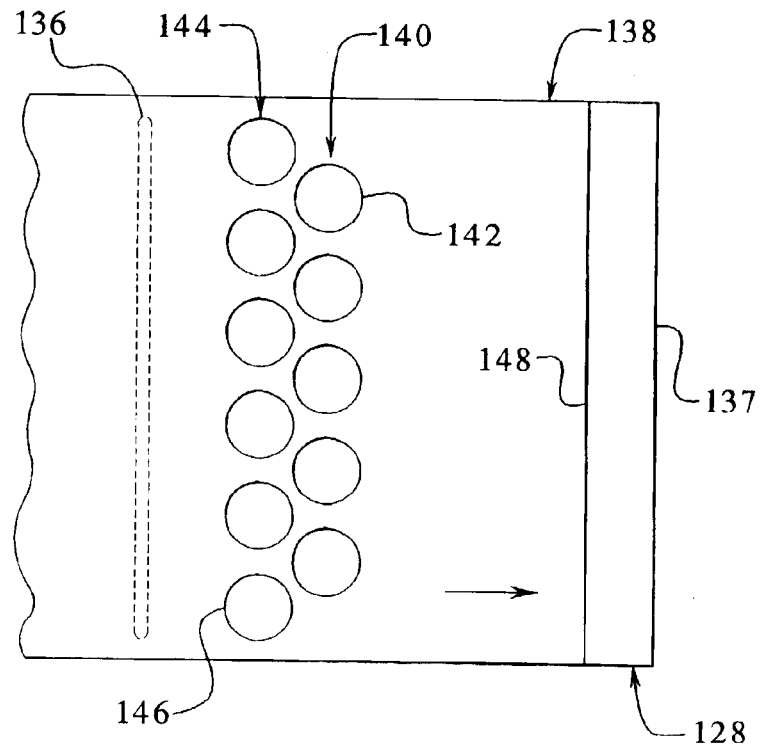

Referring to FIG. 4E, the mold plate 138 reverses direction (arrow pointing towards front edge 137 of the filling plate 128) and accelerates either at a predetermined rate or virtually instantaneously as previously described. The maximum velocity in the reverse direction may be less than, equal to or greater than the maximum velocity in the initial direction. At this fifth point in time, the slot 136 has traversed back across, and has fluidly communicated with, the same area of the front row 140 as in the other direction and now fluidly communicates again with the cavities 146 of the rear row 144. The cavities 142 of the front row 140 now preferably have complete meat patties ready to be stamped. The slot 136 now enables the pump to completely fill the cavities 146 of the rear row 144 if it did not do so on the initial pass. Referring to FIG. 4F, at a sixth point in time, both rows 140 and 144 have cleared the fill slot 136 and now move, via the mold plate 138, with complete meat patties, towards the well known patty discharge or knockout apparatus.

Figure 5A:
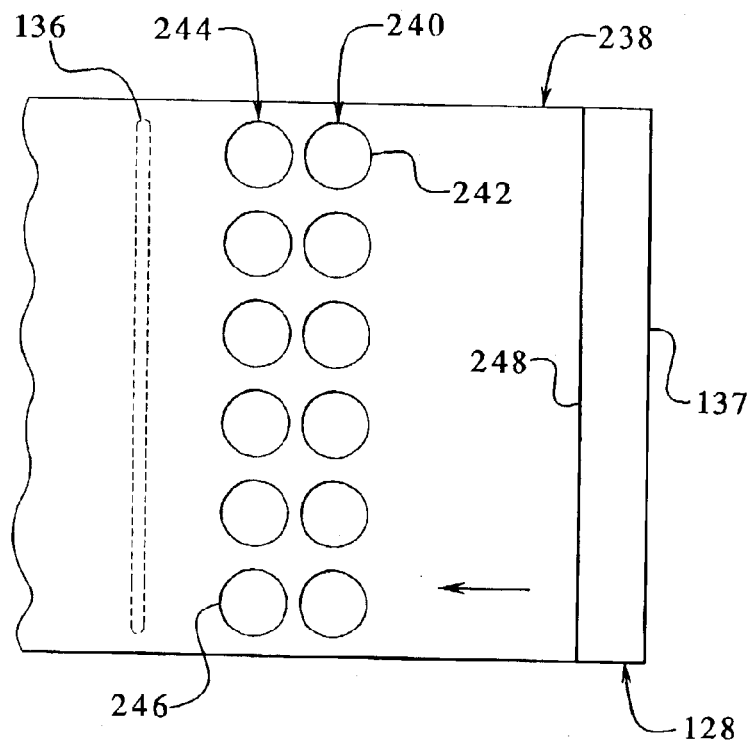
FIGS. 5A through 5F illustrate one method of filling alternative multiple stacked rows of patty making cavities.

Referring now to FIGS. 5A through 5F an alternative mold plate 238 and the fill plate 128 illustrate a method of filling rows 240 and 244 of cavities. The mold plate 238 includes the front edge 248, the front row 240 of cavities 242 and the stacked rear row 244 of cavities 246. The preferred fill plate 128 includes the elongated slot 136 as described above. The fill plate 128 again slidingly engages the mold plate 238 and the slot 136 is illustrated in phantom where appropriate. The mold plate 238 moves in the direction indicated by the arrow with respect to the stationary fill plate 128. In FIG. 5A, at a first point in time, the cavities of the rows 244 and 240 of the moving mold plate 238 are returning from the patty discharge portion of the cycle, are empty and have yet to reach the slot 136 of the fill plate 128.

Figure 5B:
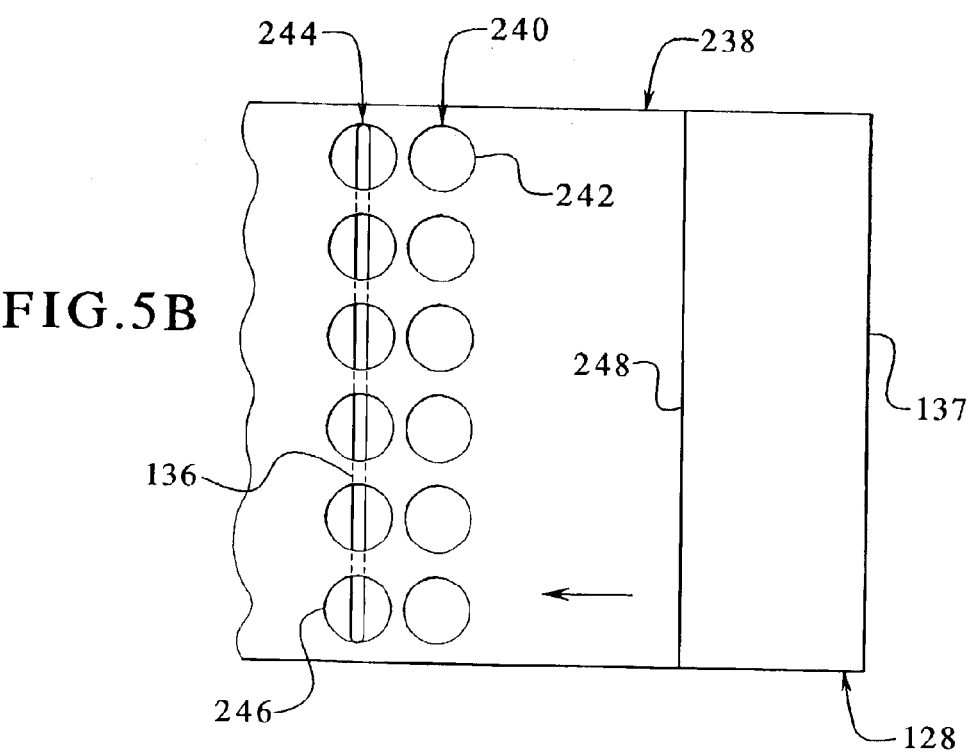
Figure 5C:
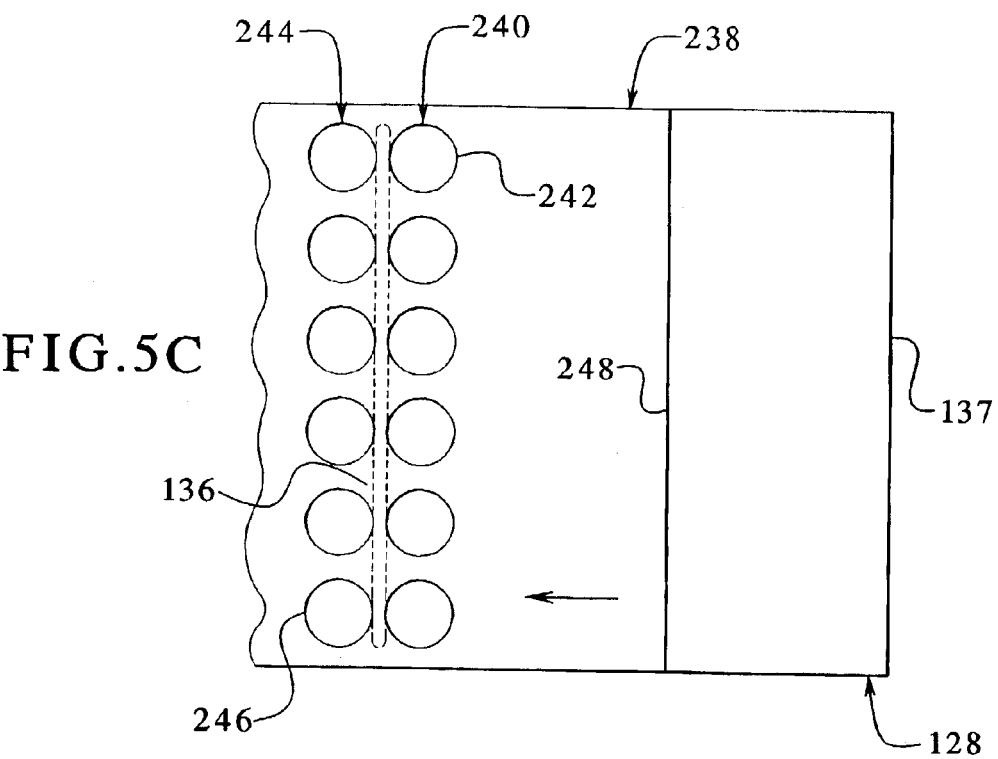

Referring to FIG. 5B, at a second point in time, the rear row 244 of cavities 246, which now has stacked cavities behind the front row 240, has reached and achieved fluid communication with the slot 136. Referring to FIG. 5C, at a third point in time, the slot, if narrow enough, can pass between the rows 240 and 244 for an instant without fluidly communicating with either row since an appropriate amount of metal thickness must exist between the cavities to keep the mold plate 238 from deforming during its manufacture or upon an accidental impact. The preferred staggered mold plate 138 is able to have more closely spaced rows, which translates into more meat patties on a given section of a conveyor belt that transfers the stamped patties to a freezer.

Figure 5D:
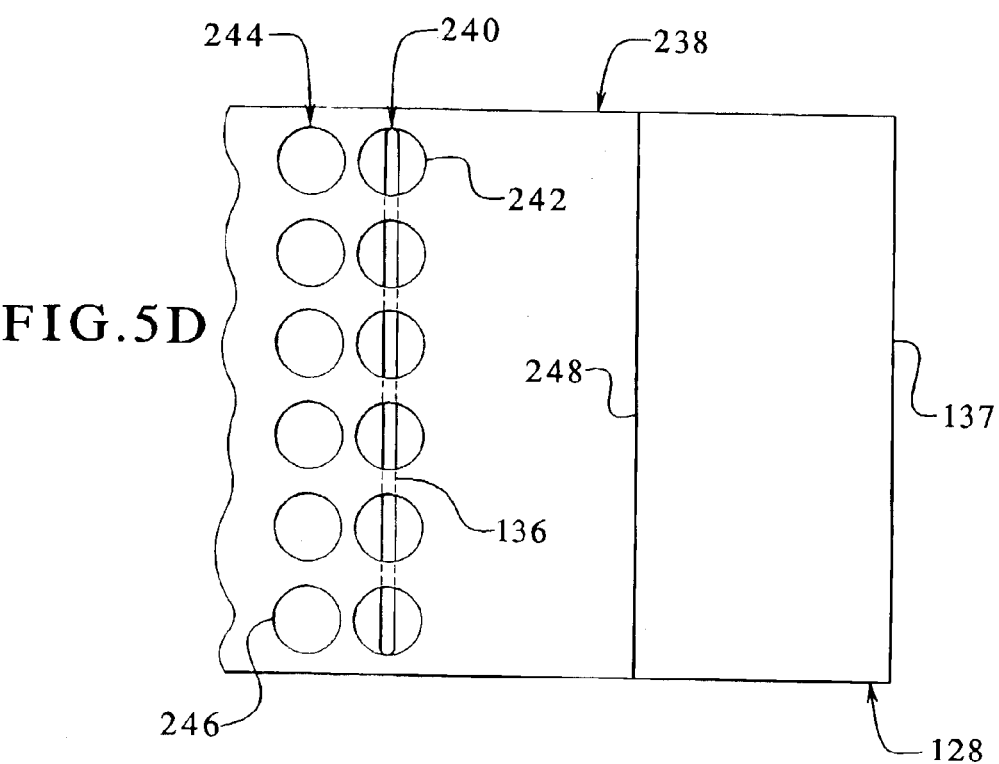

Referring to FIG. 5D, at a fourth point in time, the mold plate 238 has moved and stopped (no arrow), so that the slot center is partially through and fluidly engaging the front row 240 of cavities 242. Alternatively, the slot passes completely by or clears each of the cavities 242 of the front row 240. This alternative embodiment also includes decelerating the mold plate to a stop, virtually instantaneously, at a predetermined rate or at a plurality of predetermined deceleration rates, as described above. Further, the method for this alternative apparatus includes providing a predetermined dwell time, wherein the mold plate has zero velocity, and wherein the slot 136 is positioned under and is enabling meat to flow to the front row 240 of cavities 242.

Figure 5E:
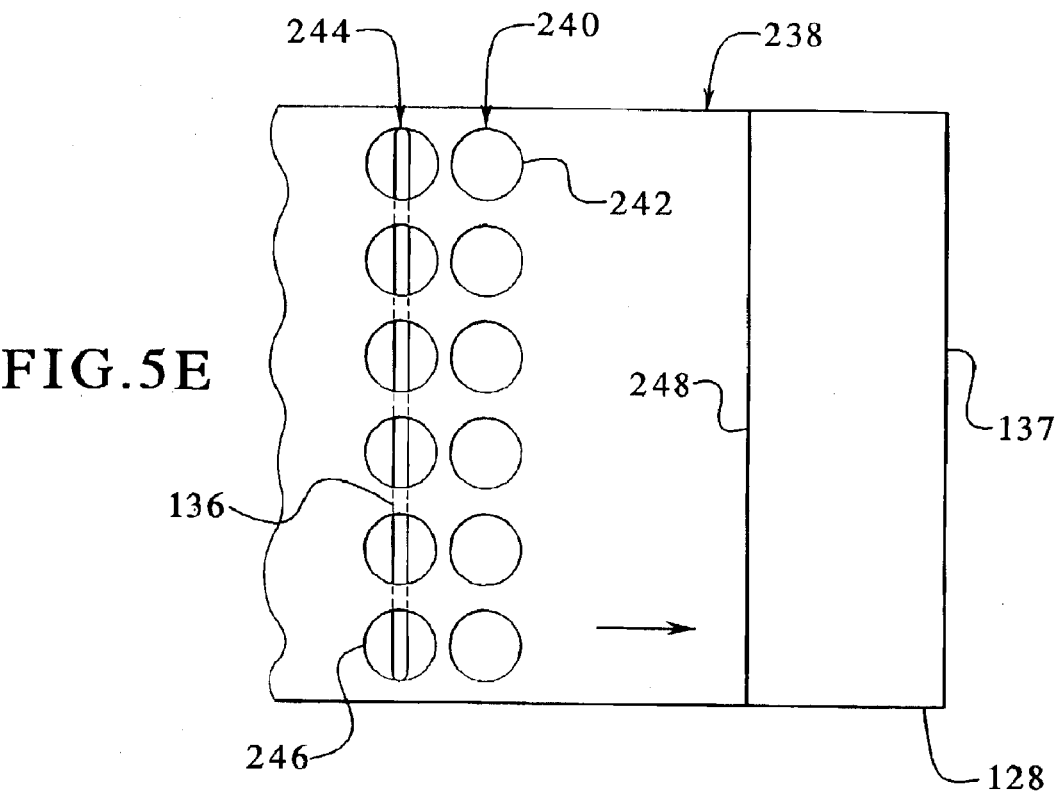
Figure 5F:
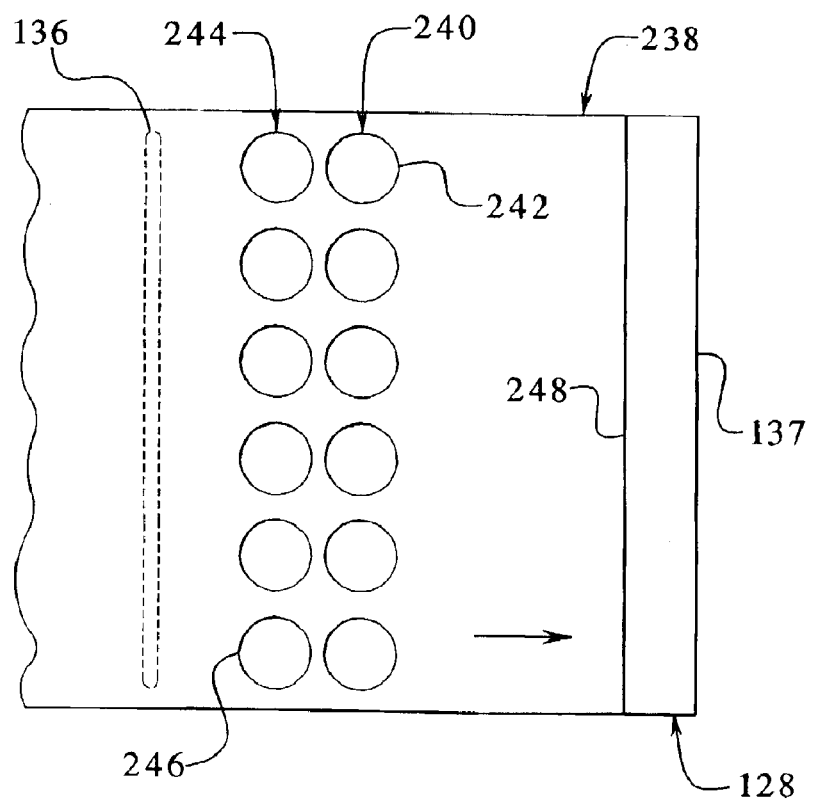

Referring to FIG. 5E, the mold plate 238 reverses direction (arrow pointing towards front edge 137 of the filling plate 128) and accelerates either at a predetermined rate or virtually instantaneously. The maximum velocity in the reverse direction may again be less than, equal to or greater than the maximum velocity in the initial direction. At this fifth point in time, the slot 136 has traversed back across the front row 240 and fluidly communicates again with the cavities 246 of the rear row 244. Referring to FIG. 5F, at a sixth point in time, both rows 240 and 244 preferably have complete meat patties, have cleared the fill slot 136 and now move towards the patty discharge or knockout apparatus.

The embodiments of FIGS. 4A through 4F and 5A through 5F illustrate a single, elongated fill slot 136, which is preferred. The uninterrupted slot 136 enables a more steady and consistent flow of meat to reach the cavities. The steadier flow of meat results in good patty consistency and uniform weight. As illustrated below, however, the single slot may be divided into a row of slots or holes as desired by the manufacturer.

Figure 6A:
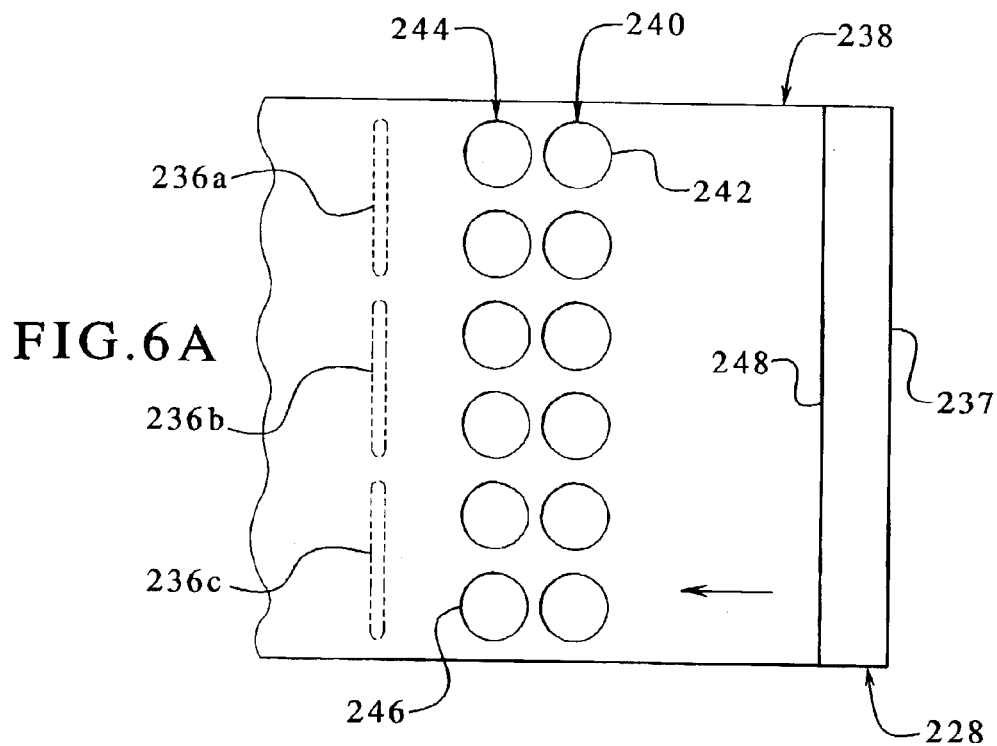

Referring now to FIGS. 6A through 6F the alternative mold plate 238 and an alternative fill plate 228 illustrate a method of filling rows the rows 240 and 244 of cavities. The mold plate 238 includes the stacked rows as described above, although this alternative embodiment is adaptable to use staggered rows. The alternative fill plate 228 includes a plurality of elongated slots 236a, 236b and 236c, which each fluidly communicate with a plurality of cavities. The fill plate 228 again slidingly engages the mold plate 238, and the slots 236a, 236b and 236c are illustrated in phantom where appropriate. The mold plate 238 moves in the direction indicated by the arrow with respect to the stationary fill plate 228. In FIG. 6A, at a first point in time, the cavities of the rows 244 and 240 of the moving mold plate 238 are returning from the patty discharge portion of the cycle, are empty and have yet to reach the slots 236a through 236c of the fill plate 228.

Figure 6B:
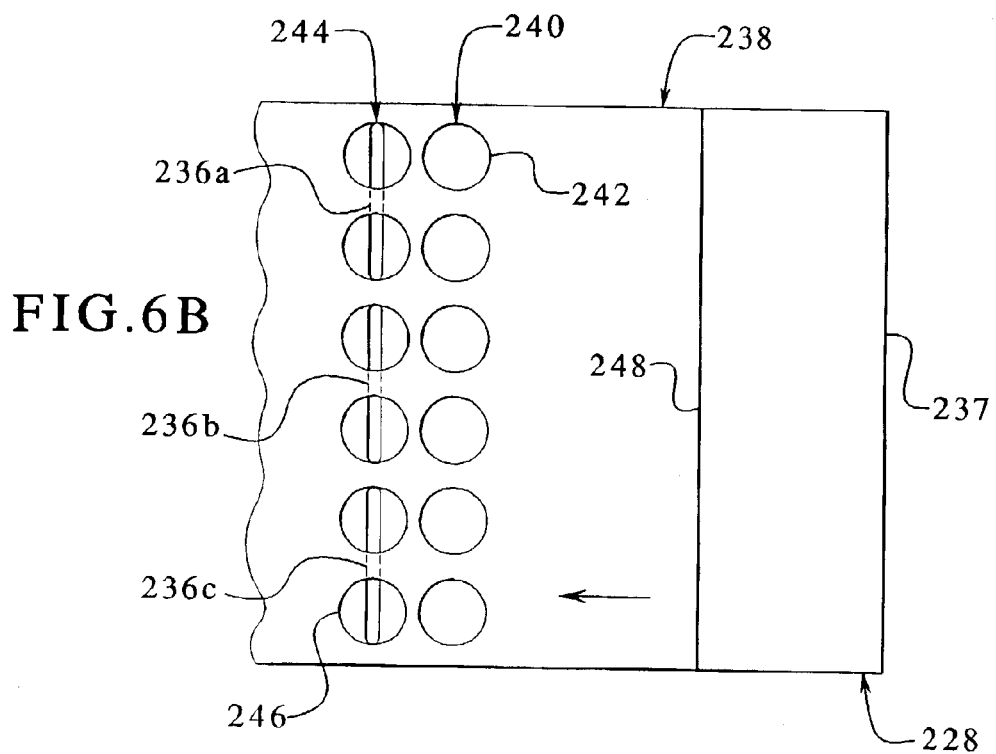

Referring to FIG. 6B, at a second point in time, the rear row 244 of cavities 246 has reached and achieved fluid communication with the slots 236a through 236c. Preferably, as illustrated, each slot 236a, 236b and 236c extends through the entire diameter of each cavity with which the slot fluidly communicates, however, the slots are adaptable to communicate with less than the entire diameter. In this alternative embodiment, each slot communicates with at least one cavity from each row and communicates with at least two cavities in one of the rows. That is, in another configuration, the outer slots 236a and 236c would only communicate with a single outer cavity, respectively, of the front row 140 of the staggered mold plate 138. The slots are adaptable to communicate with a different number of cavities, e.g., one slot communicates with two cavities while another slot of the same row communicates with three.

Referring to FIG. 6C, at a third point in time, the slots, if narrow enough, can pass in between the rows 240 and 244 for an instant without fluidly communicating with either row. Referring to FIG. 6D, at a fourth point in time, the mold plate 238 has moved and stopped (no arrow), so that the centers of the slots 236a, 236b and 236c are again partially through and fluidly engaging the front row 240 of cavities 242. Alternatively, the slots pass completely by or clear one or more of the cavities 242 of the front row 240. This alternative embodiment also includes decelerating the mold plate to a stop, virtually instantaneously, at a predetermined rate or at a plurality of predetermined deceleration rates. Further, the method for this alternative apparatus includes a dwell time, wherein the mold plate 238 has zero velocity, and wherein the slots 236a, 236b and 236c are positioned under and are enabling meat to flow to the front row 240.

Referring to FIG. 6E, the mold plate reverses direction (arrow pointing towards front edge 237 of the alternative filling plate 228) and accelerates either at a predetermined rate or virtually instantaneously. The maximum velocity in the reverse direction may again be adapted to be less than, equal to or greater than the maximum velocity in the initial direction. At this fifth point in time, the slots 236a, 236b and 236c have traversed back across the front row 240 and again fluidly communicate with the cavities 246 of the row 244. Referring now to FIG. 6F, at a sixth point in time, both rows 240 and 244 have cleared the fill slots 236a, 236b and 236c, have complete meat patties and move towards the patty discharge or knockout apparatus.

Figure 7A:
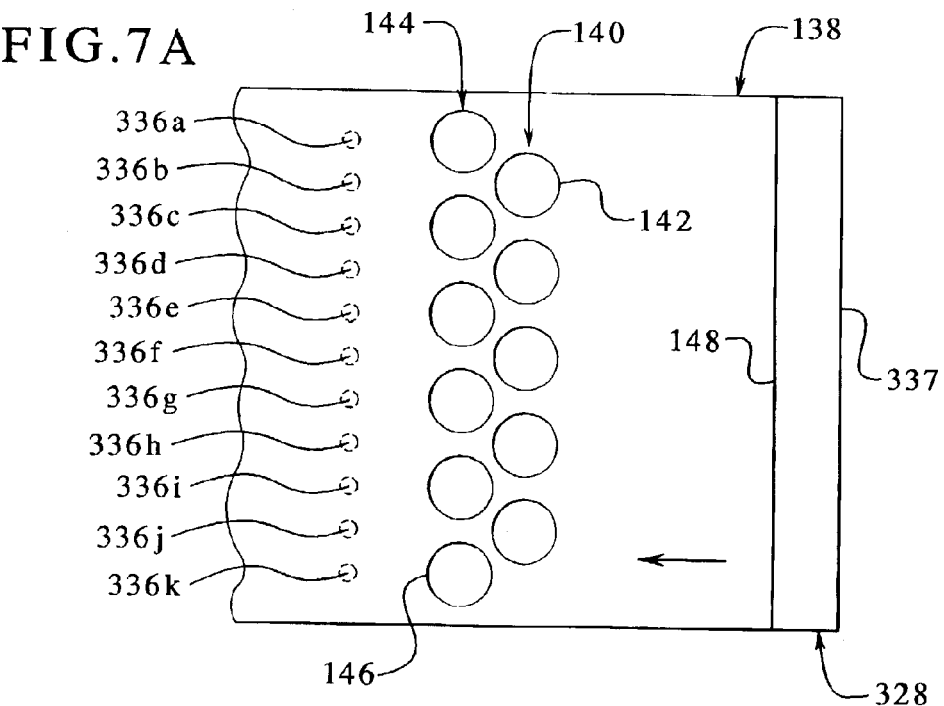

Referring now to FIGS. 7A through 7F the preferred mold plate 138 and another alternative fill plate 328 illustrate a method of filling the rows 140 and 144 of cavities. The mold plate 138 includes the preferred staggered rows. The alternative fill plate 328 includes a plurality of elongated holes or slots 336a through 336k, preferably one for each staggered cavity, so that each hole or slot fluidly communicates with a single cavity. The fill plate 328 again slidingly engages the mold plate 138, and the slots 336a through 336k are illustrated in phantom where appropriate. The mold plate 138 moves in the direction indicated by the arrow with respect to the stationary fill plate 328. In FIG. 7A, at a first point in time, the cavities of the rows 144 and 140 of the moving mold plate 138 are returning from the patty discharge portion of the cycle, are empty and have yet to reach the slots 336a through 336k of the fill plate 328.

Figure 7B:
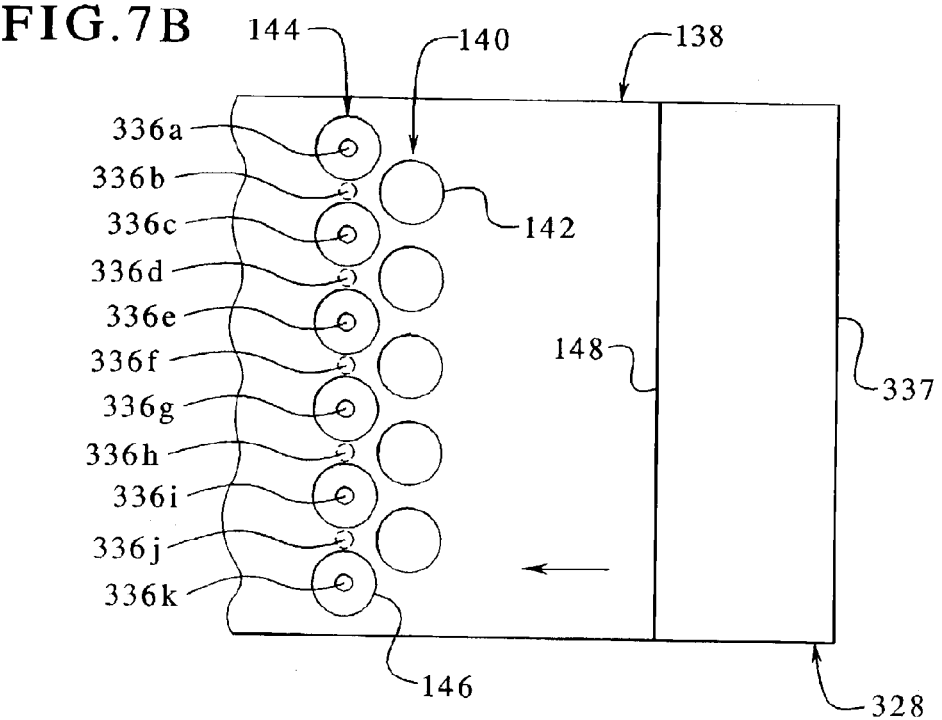

Referring to FIG. 7B, at a second point in time, the rear row 144 of cavities 146 has reached and achieved fluid communication with six of the eleven slots or holes. Preferably, as illustrated, each slot or hole 336a through 336k has approximately the same size and covers the same percentage of the open area of its associated cavity. However, different slots or holes are adaptable to cover more or less of the open areas of their respective cavities as desired. For instance, the slots or holes communicating with the front row 140 can be bigger than those communicating with the rear cavities. Or, the outer slots or holes can be slightly bigger than the inner slots or holes. In this alternative embodiment, each slot communicates with one cavity from one row and no cavities from another row. Each slot or hole is preferably unique to a single cavity. The slots 336a through 336k are adaptable to have any oblong, square or triangular shape. The slots or holes may be adapted to have any percentage of the open area of the cavities.

Referring to FIG. 7C, at a third point in time, the slots 336a through 336k pass in between the rows 140 and 144 and may or may not fluidly communicate with their respective cavities depending on the row spacing and slot or hole sizes. Referring to FIG. 7D, at a fourth point in time, the mold plate 138 has moved and stopped (no arrow), so that the centers of five of the eleven slots 336a through 336k are partially through and fluidly engaging the front row 140 of cavities 142. Alternatively, the slots pass completely by or clear one or more of the cavities 142 of the front row 140. This alternative embodiment also includes decelerating the mold plate to a stop, virtually instantaneously, at a predetermined rate or at a plurality of predetermined deceleration rates. Further, the method for this alternative apparatus includes providing a predetermined dwell time, wherein the mold plate has zero velocity, and while certain slots or holes fluidly communicate with the cavities 142 of the row 140.

Figure 7E:
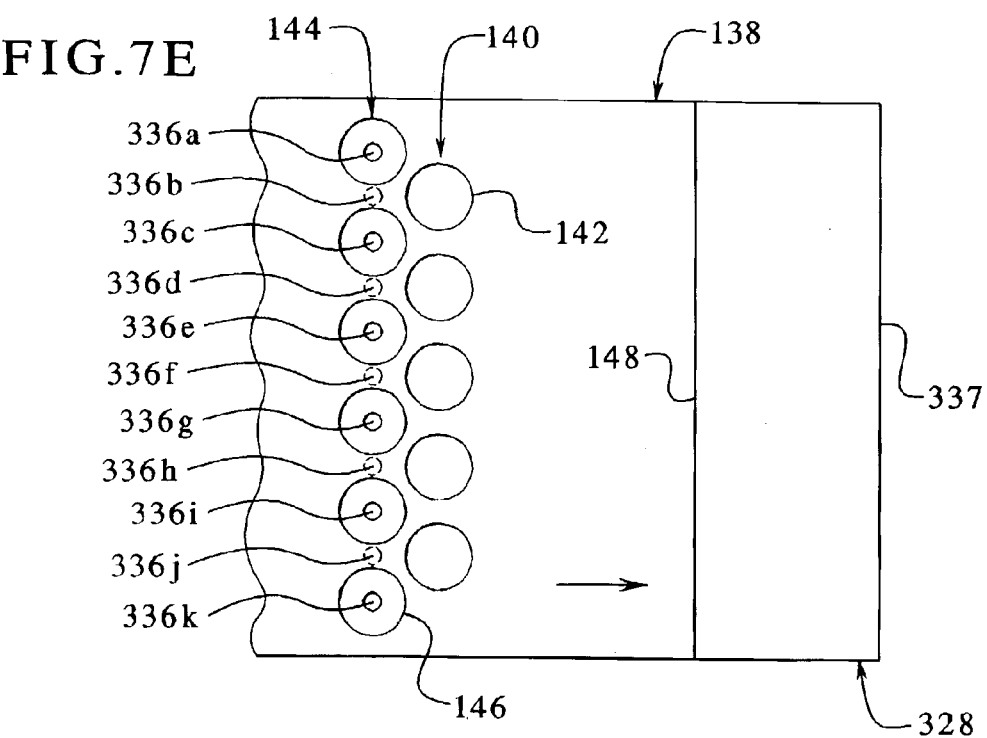
Figure 7F:
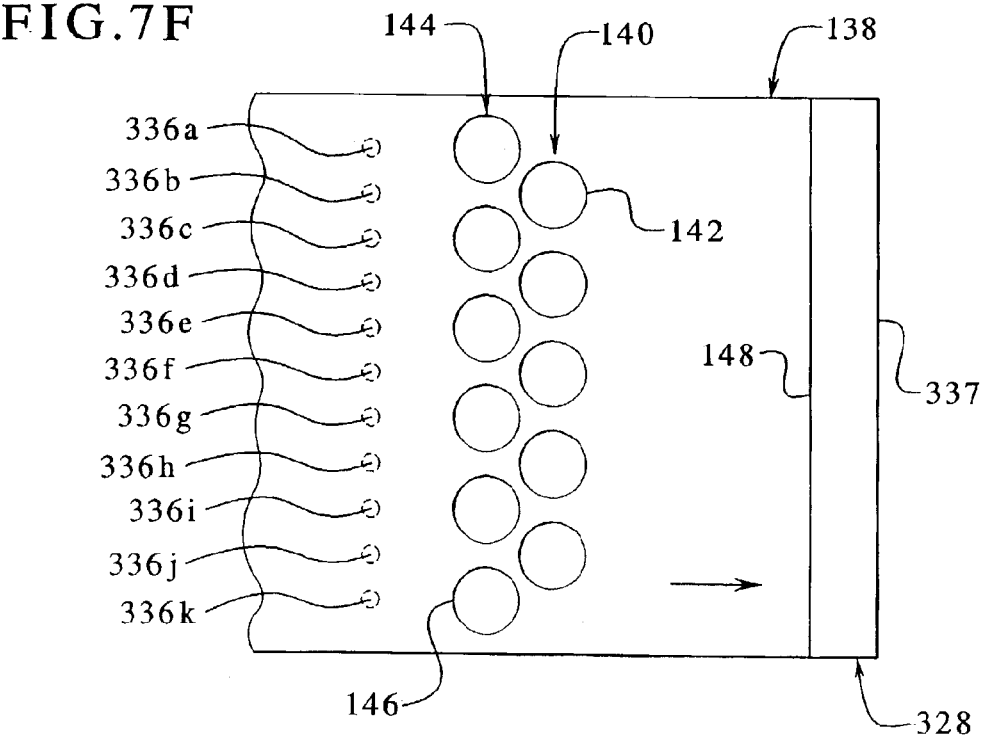

Referring to FIG. 7E, the mold plate reverses direction (arrow pointing towards front edge 337 of the alternative filling plate 328) and accelerates either at a predetermined rate or virtually instantaneously. This alternative embodiment includes the maximum velocity in the reverse direction being less than, equal to or greater than the maximum velocity in the initial direction. At this fifth point in time, the slots 336a through 336k have traversed back across the front row 140 and six of the eleven holes or slots again fluidly communicate with the cavities 146 of the rear row 144. Referring to FIG. 7F, at a sixth point in time, both rows 140 and 144 have cleared the fill slots 336a through 336k, have complete meat patties and now move towards the patty discharge or knockout apparatus.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

What is claimed is:

1. A method of operating a multiple row meat patty forming apparatus comprising the steps of:

(a) sliding a mold plate defining a plurality of cavities so that a row of at least two cavities fluidly communicates with a slot defined by a fill plate, wherein the fill plate contacts pressurized meat;

(b) in the same direction, sliding the mold plate so that at least one cavity adjacent to the row of cavities fluidly communicates with the slot;

(c) reversing direction and sliding the mold plate so that the cavity adjacent to the row of cavities fluidly communicates with the slot; and (d) in the reversed direction, sliding the mold plate so that the row of cavities fluidly communicates with the slot.

2. The method of claim 1, which includes the step of holding the cavity adjacent to the row of cavities in fluid communication with the slot for an amount of time before reversing direction.

3. The method of claim 1, wherein the row of cavities is a first row of cavities and the cavity adjacent to the first row of cavities forms part of a second row of cavities.

4. The method of claim 3, wherein the first and second rows are staggered with respect to each other.

5. The method of claim 3, wherein the first and second rows are stacked with respect to each other.

6. The method of claim 1, which includes arranging the mold plate and the fill plate so that the slot communicates fluidly with an entire open area of at least one of the cavities of the row.

7. The method of claim 1, which includes arranging the mold plate and the fill plate so that the slot communicates fluidly with an entire open area of the cavity adjacent to the row of cavities.

8. The method of claim 1, wherein the slot in the fill plate is one of a plurality of slots in the fill plate.

9. The method of claim 8, which includes forming a row of slots from the plurality of slots in the fill plate.

10. The method of claim 1, wherein at least one of the cavities is substantially round.

11. The method of claim 1, wherein steps (a) and (b) occur in a patty-forming direction and steps (c) and (d) occur in patty-stamping direction.

12. A method of operating a multiple row meat patty forming apparatus comprising the steps of:

(a) sliding a mold plate defining a plurality of cavities so that a first cavity fluidly communicates with a slot defined by a fill plate, wherein the fill plate contacts pressurized meat;

(b) in the same direction, sliding the mold plate so that a row of cavities adjacent to the first cavity fluidly communicates with the slot;

(c) reversing direction and sliding the mold plate so that the row fluidly communicates with the slot; and (d) in the reversed direction, sliding the mold plate so that the first cavity fluidly communicates with the slot.

13. The method of claim 12, which includes the step of holding the row of cavities in fluid communication with the slot for an amount of time before reversing direction.

14. The method of claim 12, wherein the row of cavities is a first row of cavities and the first cavity forms part of a second row of cavities.

15. The method of claim 14, wherein the first and second rows are staggered with respect to each other.

16. The method of claim 14, wherein the first and second rows are stacked with respect to each other.

17. The method of claim 12, which includes arranging the mold plate and the fill plate so that the slot communicates fluidly with an entire open area of at least one of the cavities of the row.

18. The method of claim 12, which includes arranging the mold plate and the fill plate so that the slot communicates fluidly with an entire open area of the first cavity.

19. The method of claim 12, wherein the slot in the fill plate is one of a plurality of slots in the fill plate.

20. The method of claim 19, which includes forming a row of slots from the plurality of slots in the fill plate.

21. The method of claim 12, wherein at least one of the cavities is substantially round.

22. The method of claim 12, wherein steps (a) and (b) occur in a patty-forming direction and steps (c) and (d) occur in patty-stamping direction.

23. A method of operating a multiple row meat patty forming apparatus comprising the steps of:

(a) sliding a mold plate defining a plurality of cavities so that a first row of cavities fluidly communicates with a first set of slots from a row of slots defined by a fill plate, wherein the fill plate contacts pressurized meat;

(b) in the same direction, sliding the mold plate so that a second row of cavities fluidly communicates with a second set of slots from the row of slots;

(c) reversing direction and sliding the mold plate so that the second row of cavities fluidly communicates with the second set of slots; and (d) in the reversed direction, sliding the mold plate so that the first row of cavities fluidly communicates with the first set of slots.

24. The method of claim 23, which includes arranging the mold plate and the fill plate so that at least one of the slots from the first or second sets of slots communicates fluidly with an entire open area of one of the cavities.

25. The method of claim 23, wherein at least one of the cavities is substantially round.

26. The method of claim 23, wherein steps (a) and (b) occur in a patty-forming direction and steps (c) and (d) occur in patty-stamping direction.

27. A method of operating a multiple row meat patty forming apparatus comprising the steps of:

(a) sliding a mold plate defining a plurality of cavities so that a first row of cavities fluidly communicates with a slot defined by a fill plate, wherein the fill plate contacts pressurized meat;

(b) in the same direction, sliding the mold plate so that a second row of cavities fluidly communicates with the slot;

(c) reversing direction and sliding the mold plate so that the second row of cavities fluidly communicates with the slot; and (d) in the reversed direction, sliding the mold plate so that the first row of cavities fluidly communicates with the slot.

28. The method of claim 27, wherein the first and second rows are staggered with respect to each other.

29. The method of claim 27, wherein the first and second rows are stacked with respect to each other.

30. The method of claim 27, wherein at least one of the cavities is substantially round.

31. The method of claim 27, wherein steps (a) and (b) occur in a patty-forming direction and steps (c) and (d) occur in patty-stamping direction.

* * * * *